(12) United States Patent
Antony et al.

(10) Patent No.: US 10,275,272 B2
(45) Date of Patent: Apr. 30, 2019

(54) VIRTUAL MACHINE RECOVERY IN SHARED MEMORY ARCHITECTURE

(71) Applicant: VMWARE, INC., Palo Alto, CA (US)

(72) Inventors: Jinto Antony, Bangalore (IN); Hariharan Jeyaraman Ganesan, Bangalore (IN); Saju Chengat, Bangalore (IN); Madhusudhanan Gangadharan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 251 days.

(21) Appl. No.: 15/335,475

(22) Filed: Oct. 27, 2016

(65) Prior Publication Data
US 2017/0364287 A1    Dec. 21, 2017

(30) Foreign Application Priority Data
Jun. 20, 2016  (IN) .............................. 201641021075

(51) Int. Cl.
*G06F 3/06* (2006.01)
*G06F 9/455* (2018.01)
*G06F 11/16* (2006.01)

(52) U.S. Cl.
CPC ........ *G06F 9/45558* (2013.01); *G06F 3/0619* (2013.01); *G06F 3/0665* (2013.01); *G06F 3/0685* (2013.01); *G06F 11/16* (2013.01); *G06F 2009/4557* (2013.01); *G06F 2009/45575* (2013.01); *G06F 2009/45583* (2013.01)

(58) Field of Classification Search
CPC .... G06F 3/0619; G06F 3/0665; G06F 3/0685; G06F 9/45558; G06F 11/16; G06F 2009/4557; G06F 2009/45575; G06F 2009/45583; G06F 2201/84; G06F 2201/815

See application file for complete search history.

(56) References Cited

U.S. PATENT DOCUMENTS

2010/0211829 A1* 8/2010 Ziskind ............... G06F 11/0709
                                                                714/48

OTHER PUBLICATIONS

Unknown, "Cloud Architecture Optimized for Software-Defined Structure", Intel Corporation, captured Jun. 6, 2016, http://www.intel.com/content/www/us/en/architecture-and-technology/intel-rack-scale-architecture.html, 9 pages.
J. Kumar, "Rack Scale Architecture—Platform and Management", Intel Corporation, Copyright 2014, 46 pages.

* cited by examiner

*Primary Examiner* — Aracelis Ruiz

(57) ABSTRACT

Examples provide for virtual machine recovery using pooled memory. A shared partition is created on pooled memory accessible by a plurality of virtual machine hosts. A set of memory pages for virtual machines running on the hosts is moved to the shared partition. A master agent polls memory page tables associated with the plurality of hosts for write access. If the master agent obtains write access to a memory page table of a given host, the given host that previously held the write access is identified as a failed host or an isolated host. The virtual machines of the given host enabled to resume from pooled memory are respawned on a new host while maintaining memory state of the virtual machines using data within the pooled memory, including the virtual machine memory pages, memory page table, host profile data, and/or host-to-VM table data.

20 Claims, 17 Drawing Sheets

VIRTUAL MACHINE RECOVERY IN SHARED MEMORY ARCHITECTURE

RELATED APPLICATIONS

Benefit is claimed under 35 U.S.C. 119(a)-(d) to Foreign application Serial No. 201641021075 filed in India entitled "VIRTUAL MACHINE RECOVERY IN SHARED MEMORY ARCHITECTURE", on Jun. 20, 2016, by VMware, Inc., which is herein incorporated in its entirety by reference for all purposes.

The present application is related in subject matter to U.S. patent application Ser. No. 15/335,467, which is incorporated herein by reference.

BACKGROUND

In a high availability (HA) cluster of virtual machine hosts, if a host in the cluster is believed to have crashed, the virtual machines running on the crashed host are restarted on another host in the cluster. However, restarting a virtual machine on another host does not maintain a state of the virtual machine. For example, a memory state of the virtual machine typically resides on local virtual machine disk memory associated with the original host, which is inaccessible by any new host on which the virtual machine is restarted. Moreover, the restart of a virtual machine on a new host frequently requires significant time to recover the guest operating system and application after reboot. Thus, the restart process is frequently a time consuming and inefficient process.

SUMMARY

One example provides a method for virtual machine recovery using pooled memory. A set of memory page tables in the pooled memory is polled for write access by a master agent running on a first host in a plurality of virtual machine hosts. On obtaining write access to a memory page table associated with a second host in the plurality of hosts, the second host is identified as a failed host. The second host is associated with a set of virtual machines. The set of virtual machines include a memory state. The set of virtual machines are respawned on the first host using memory page table metadata.

BRIEF DESCRIPTION OF THE DRAWINGS

Corresponding reference characters indicate corresponding parts throughout the drawings.

DETAILED DESCRIPTION

Examples described herein provide a virtual machine memory in a shared partition on pooled memory that is accessible by all hosts in a cluster for utilization in respawning virtual machines on a new host when host isolation or host failure occurs. The shared pooled memory enables a reduced error rate when respawning the virtual machine (VM) process in another host using the memory state of the VM in the pooled memory. This maintains the state of the VM even after a VM failure. Thus, the shared pooled memory enables faster and more reliable recovery of virtual machines during a host failure.

In some examples, a master agent identifies set of virtual machines associated with first host that is a failed or isolated host, assign the set of virtual machine memory pages to a different second host, and respawn the set of virtual machines on the second host using the set of virtual machine memory pages in the pooled memory. Using the pooled memory to respawn the VM enables improved efficiency in recovery from a failed host and improved accuracy of virtual machine memory assigned to the second host.

In other examples, a crash manager is provided to intelligently manage one or more virtual machine host crashes in a data center and protect running state of virtual machines so as to resume the virtual machines in a dedicated backup host appliance without losing the state of the virtual machines, maintained per rack, by dynamically configuring the backup host appliance with crashed host configurations using a shared memory resource pool architecture. The virtual machine memory for one or more virtual machines is stored on one or more shared memory partitions in the pooled memory. This reduces memory usage and avoids the necessity of creating shadow virtual machines that are running all the time, which reduces processor usage, network bandwidth usage, and physical memory usage.

In some examples, during a virtual machine respawn, a new host accesses the virtual machine memory, configuration, metadata, and other virtual machine data on the pooled memory to respawn the virtual machine while maintaining virtual machine memory state, run time state, and configuration. This feature provides seamless protection of running state and memory state of virtual machine and reduces respawn time. The virtual machines are respawned more efficiently with less down time while consuming fewer system resources.

Figure 1:
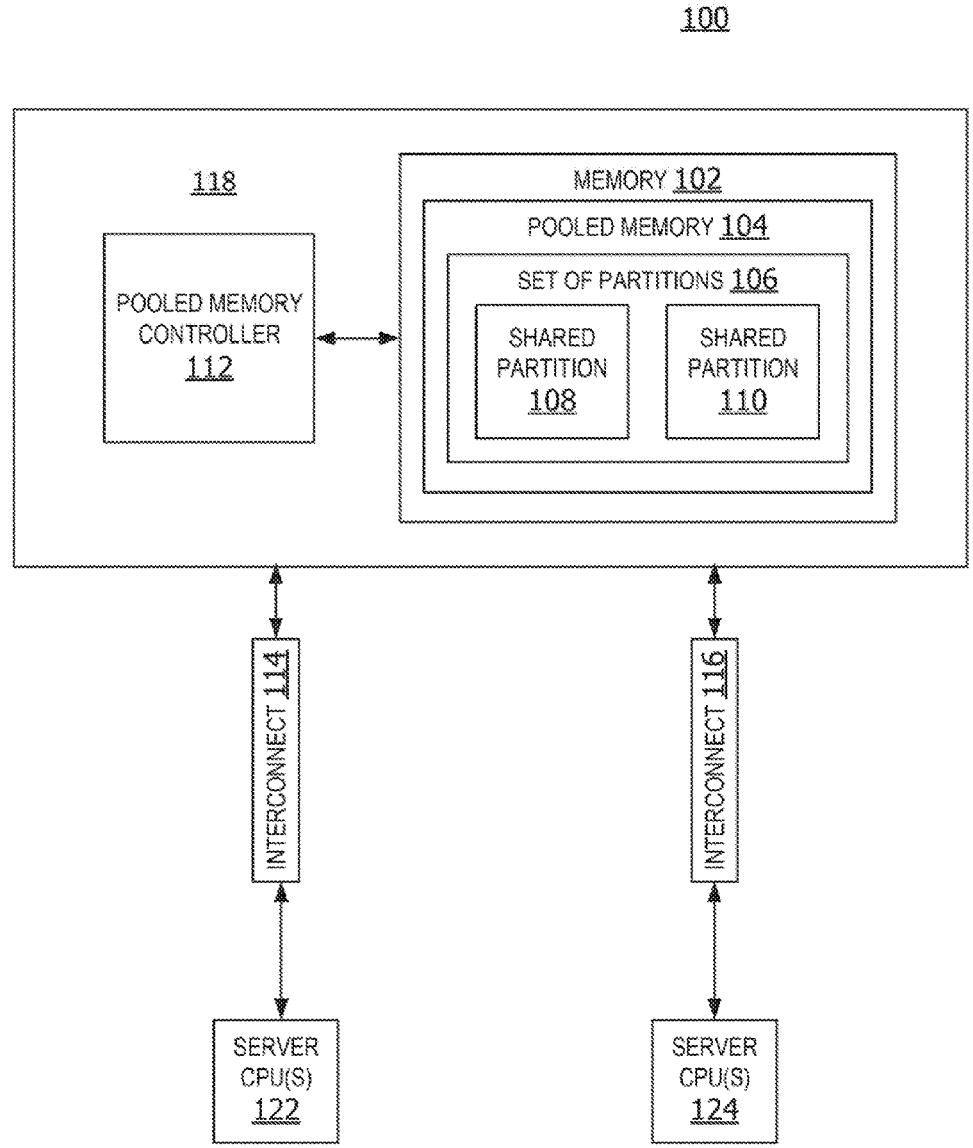
FIG. 1 is a block diagram of a shared memory architecture for a cluster of virtual machine hosts.

FIG. 1 is a block diagram of a shared memory architecture for a cluster of virtual machine hosts. The shared memory architecture 100 is a logical architecture that disaggregates memory and allows pooling of memory resources for more efficient utilization of memory. The shared memory architecture 100 in this non-limiting example utilizes server side dual in-line memory (DIMMs) and/or non-volatile dual in-line memory (NVDIMMs) to create a disaggregated memory pool. The memory pools are divided into one or more shared memory pools and one or more dedicated memory pools.

In some non-limiting examples, the shared memory architecture is implemented in a Rack Scale Architecture (RSA). An RSA disaggregates storage, compute, and network resources. An RSA permits pooling of resources for more efficient utilization of assets. An RSA may also be utilized to simplify resource management dynamically allocate resources based on workload-specific demands. One non-limiting example of a RSA includes, but is not limited to, an INTEL Rack Scale Architecture.

In some non-limiting examples, the shared memory architecture 100 utilizes INTEL RSA PCIe for connections between nodes to the top-of-the-rack switch. In this example, the network and storage connections terminate at the top-of-the-rack switch with the traffic being sent to each node over the PCIe interconnects. In this case, if the connection from a node to the switch is dead, both the shared memory and the shared storage/network channels will also be down. In other words, the correlation between failures on the shared pooled memory and the network/storage are likely to be non-trivial in this example.

In this non-limiting example, the memory 102 is implemented in physical random access memory (RAM). The memory 102 may be referred to as main memory. The memory includes pooled memory 104. The pooled memory 104 is shared memory accessible by all server hosts in the cluster of virtual machine hosts connected to the pooled memory 104. The pooled memory 104 enables memory sharing between different hosts within a virtual machine host cluster.

In other examples, RSA is only used between servers within a single rack. In this example, the shared pooled memory cannot be created between random servers in a datacenter. In other words, the pooled memory in these examples is only created between servers within the rack.

A set of partitions 106 may be provisioned on the pooled memory 104. As used herein, the term "set" refers to one or more, unless defined otherwise herein. In this example, the set of partitions 106 includes a set of one or more memory partitions. A partition may be a per-host partition or a shared partition. A shared partition is a partition that is accessible by two or more hosts in a cluster. In some examples, the shared partition is accessible by all hosts in the cluster. In this example, shared partition 108 and shared partition 110 are memory partitions that are accessible by more than one host in the cluster.

A shared partition may be utilized to store data generated or updated by a single host, a single virtual machine, two or more hosts, as well as two or more virtual machines. In other words, a shared partition that is accessible by multiple different hosts may be locked so as to permit only one host or one virtual machine to generate, update, or otherwise alter data stored in the shared partition.

In this example, the pooled memory includes two shared memory partitions. However, in other examples, the pooled memory may include a single shared partition, no shared partitions, as well as three or more shared partitions.

The pooled memory architecture 118 includes a pooled memory controller 112 in this example. The pooled memory controller 112 is a component for managing the pooled RAM. The pooled memory controller in this non-limiting example manages the set of partitions 106 and allocates memory to entities, such as, but not limited to, hosts and/or virtual machines.

In this example, the memory 102 is shared by all processors associated with the cluster, such as set of processors. In this example, the set of processors includes server central processing units (CPUs) 122 and 124. The server CPUs access the memory 102 via one or more interconnects, such as interconnect 114 and/or interconnect 116. This non-limiting example includes two server CPUs and two interconnects. However, other examples include any number of server CPUs and interconnects. For example, the shared memory architecture 100 may include three or more server CPUs.

Figure 2:
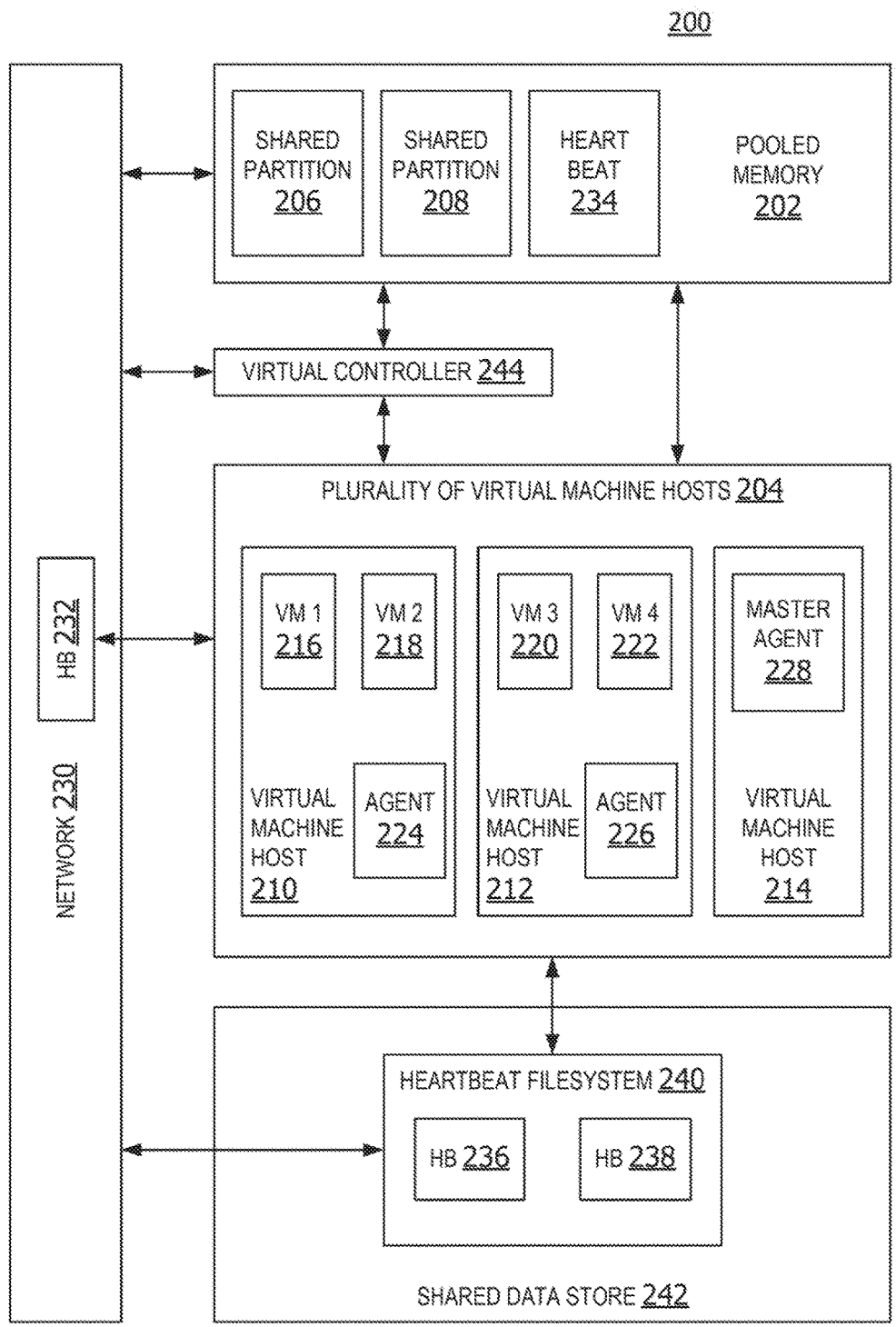
FIG. 2 is a block diagram illustrating heartbeat monitoring in a shared memory architecture.

FIG. 2 is a block diagram illustrating heartbeat monitoring in a shared memory architecture. The shared memory architecture 200 in this example includes at least one shared partition in the pooled memory 202 for heartbeat monitoring of one or more hosts in a plurality of virtual machine hosts 204.

The pooled memory 202 includes one or more shared partitions, such as shared partition 206 and shared partition 208. In this example, the pooled memory also includes a shared memory partition in the pooled memory 202 for heartbeat communication between all the hosts in the plurality of virtual machine hosts 204 in a cluster of virtual machine hosts.

The plurality of virtual machine hosts 204 is a set of two or more servers capable of hosting one or more virtual machines. A virtual machine host may be referred to as a node, a host, a server, a host server, a host computing device, or a cluster server. In some non-limiting examples, each host in the plurality of virtual machine hosts is a blade server within a RSA. In other examples, a host is implemented as Elastic Sky X (ESX) or ESXi host from VMware, Inc.

In this example, the plurality of virtual machine hosts 204 includes three hosts, virtual machine host 210, virtual machine host 212, and virtual machine host 214. In other examples, the plurality of virtual machine hosts includes only two hosts, as well as four or more hosts.

Each host is capable of serving one or more virtual machines. In this example, virtual machine host 210 serves virtual machine (VM 1) 216 and virtual machine (VM 2) 218. The virtual machine host 212 serves virtual machine (VM 3) 220 and virtual machine (VM4) 222. In this example, hosts 212 and 214 serve two virtual machines. However, in other examples, a virtual machine host may be serving a single virtual machine, three or more virtual machines, as well as no virtual machines.

An agent runs inside each host. The agent uses heartbeat data to monitor hosts and determine a current host operational status. An operational status includes a network isolation of the host, a lost pooled memory connection, a lost shared data store connection, or a failed host status. In this example, agent 224 runs inside virtual machine host 210, agent 226 runs inside virtual machine host 212, and master agent 228 runs on virtual machine host 214. In some examples, the agent is a high availability (HA) agent.

The plurality of virtual machine hosts 204 are connected to each other via a network 230. The hosts send and receive network heartbeat packages via the network 230. In some examples, each agent on each host sends a network heartbeat 232 signal to the other hosts over the network 230 at a predetermined interval. The predetermined interval is any time interval selected by a user, administrator, or default interval.

In some examples, the master agent 228 monitors the network heartbeat for all hosts in the plurality of hosts. If the master agent 228 fails to receive a network heartbeat from a given host in the plurality of hosts within a predetermined time period since the last network heartbeat was received from the given host, the master agent 228 identifies the given host as a network isolated host. The master agent 228 then determines whether the host is an isolated host or a failed host based on a pooled memory heartbeat 234.

The pooled memory heartbeat 234 is a host heartbeat shared through pooled memory 202. In some examples, the pooled memory heartbeat 234 is a pooled memory heartbeat file associated with virtual machine host 210. The agent 224 updates the pooled memory heartbeat file at regular intervals to maintain a lock on the file. The master agent 228 checks the pooled memory heartbeat 234 at regular intervals to determine if the file is locked. If the heartbeat file is unlocked, the master agent 228 identifies the host 210 associated with the pooled memory heartbeat 234 as a host that has lost access to the pooled memory. If the master agent 228 has failed to receive a network heartbeat 232 from the virtual machine host 210, the master agent in some examples identifies the host 210 as a failed host.

In still other examples, even if the host 210 has an inactive pooled memory heartbeat and an inactive network heartbeat, the master agent 228 does not identify the host as a failed host unless the host also has an inactive data store heartbeat, such as data store heartbeat 236 or heartbeat 238 in data store heartbeat filesystem 240 on shared data store 242. The shared data store 242 is a data store that is accessible by all hosts in the cluster. The shared data store 242 may include databases, filesystem, files, or other collections of data.

In this example, each agent running on each host in the plurality of virtual machine hosts updates a heartbeat file associated with each host at regular intervals. For example, the agent 224 updates the heartbeat 236 file for virtual machine host 210 at regular intervals to maintain a lock on the heartbeat 236 file. If the agent 224 fails to update the heartbeat file within a predetermined period of time, the shared data store heartbeat file is unlocked indicating that the host 210 has an inactive data store heartbeat.

In some examples, if the network heartbeat 232, the pooled memory heartbeat 234, and the shared data store heartbeat 236 for host 210 are all inactive, the master agent identifies the host 210 as a failed host. A failed host may also be referred to as a crashed host. If a host is identified as a failed host, the master agent in some examples triggers respawn of the virtual machines running on the failed host on another host.

In this example, the VMs running on the failed host may be respawned on any host having access to the shared pooled memory. For example, if host 210 fails, the virtual machines 216 and 218 are respawned on another host, such as virtual machine host 212.

In a typical datacenter or cloud management aspect with a cluster of hosts managing workloads, there are various ways in which a host server may crash or purple screen of death (PSOD). Currently available fault tolerance solutions consume significant central processing unit (CPU), memory, network bandwidth, and other resources. Moreover, these current fault tolerance solutions do not seamlessly protect running state of virtual machines. For example, currently used fault tolerance shadow virtual machines run all the time, consuming equal server resources while waiting for a crash situation. Moreover, this is not a dynamic solution, as shadow virtual machines only provide protection for a minimal number of virtual machines running in a cluster and not to all the virtual machines running on the cluster. For example, in a typical shadow virtual machine fault tolerance solution, only two virtual machines on a host are protected during a crash scenario.

In addition, during a host failure, such as a crash state or PSOD, it takes time to recover the running states of the virtual machines and critical transactional data may be lost in run time.

In contrast, in some examples, the virtual machines running on a failed host are respawned on a new host using virtual machine memory stored on the pooled memory. The virtual machine memory on the shared pooled memory of this example provides seamless protection of running state for the virtual machines and provides protection to mission critical virtual machines during a crash or PSOD scenario for all virtual machines running on a given host. Moreover, the pooled memory virtual machine memory pages and/or memory page tables may be used to provide protection of memory state and runtime state for one or more virtual machines on all hosts in the cluster quickly and efficiently while reducing host resource usage during virtual machine recovery, such as processor usage, memory usage, and network bandwidth usage.

In these examples, a virtual machine memory is maintained in a shared partition, such as shared partition 206. If the host fails, the virtual machine is respawned on a new host that then accesses the virtual machine's memory on the shared partition in pooled memory. In this manner, a virtual machine is respawned on a new host while maintaining a memory state of the virtual machine without consuming additional memory and without copying the virtual machine memory to multiple locations in memory.

In other examples, the shared memory architecture includes a virtual controller 244. The virtual controller 244 in some examples is a component for managing multiple hosts and virtual machines. creating shared memory partitions for hosts, such as shared partition 206 and shared partition 208. The virtual controller 244 provisions a shared memory partition for the pooled memory heartbeat of each host. In some non-limiting examples, the virtual controller is implemented as VirtualCenter (vCenter) server from VMware. Inc.

Figure 3:
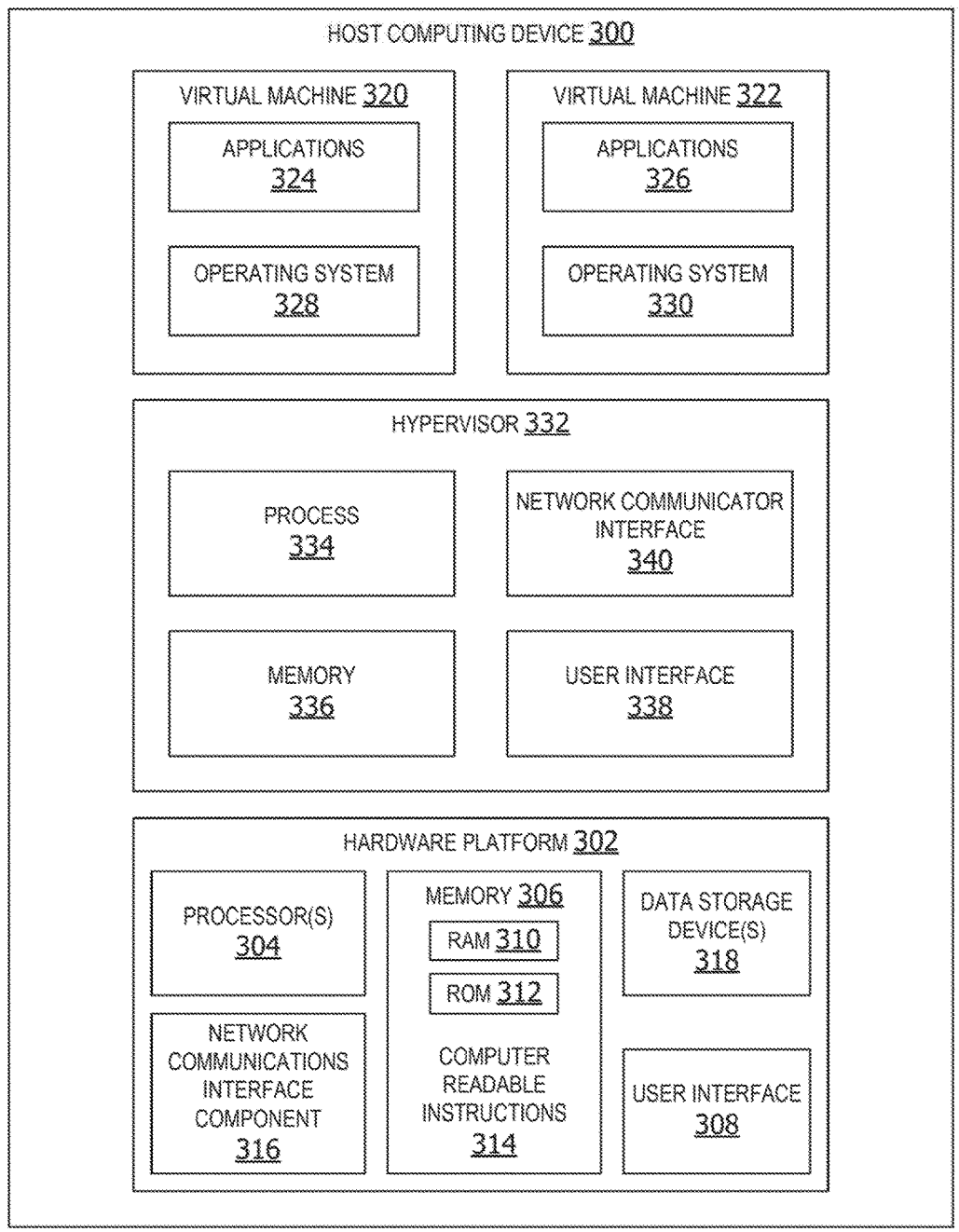
FIG. 3 is a block diagram of a host computing device for serving one or more virtual machines.

FIG. 3 is a block diagram of a host computing device for serving one or more virtual machines. The illustrated host computing device 300 may be implemented as any type of host computing device, such as a server. In some non-limiting examples, the host computing device 300 is implemented as a host or ESXi host from VMware, Inc.

The host computing device 300 represents any device executing instructions (e.g., as application(s), operating system, operating system functionality, or both) to implement the operations and functionality associated with the host computing device 100. The computing device 100 may include desktop personal computers, kiosks, tabletop devices, industrial control devices, wireless charging stations, or server. In some examples, the host computing device 300 is implemented as a blade server within a RSA. Additionally, the host computing device 300 may represent a group of processing units or other computing devices.

The host computing device 300 includes a hardware platform 302. The hardware platform 302, in some examples, includes one or more processor(s) 304, a memory 306, and at least one user interface, such as user interface component 308.

The processor 304 includes any quantity of processing units, and is programmed to execute computer-executable instructions for implementing the examples. The instructions may be performed by the processor or by multiple processors within the host computing device 300, or performed by a processor external to the host computing device 300. In some examples, the processor 304 is programmed to execute instructions such as those illustrated in the figures (e.g., FIG. 9, FIG. 10, FIG. 11, and FIG. 12).

The host computing device 300 further has one or more computer readable media such as the memory 306. The memory 306 includes any quantity of media associated with or accessible by the host computing device 300. The memory 306 may be internal to the host computing device 300 (as shown in FIG. 3), external to the host computing device (not shown), or both (not shown). In some examples, the memory 306 includes read-only memory (ROM) 310.

The memory 306 further stores a random access memory (RAM) 312. The RAM 312 may be any type of random access memory. In this example, the RAM 312 is part of a shared memory architecture. In some examples, the RAM 312 may optionally include one or more cache(s). The memory 302 further stores one or more computer-executable instructions 314.

The host computing device 300 may optionally include a user interface component 308. In some examples, the user interface component 308 includes a graphics card for displaying data to the user and receiving data from the user. The user interface component 308 may also include computer-executable instructions (e.g., a driver) for operating the graphics card. Further, the user interface component 308 may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor.

In some examples, the hardware platform 302 optionally includes a network communications interface component 316. The network communications interface component 316 includes a network interface card and/or computer-executable instructions (e.g., a driver) for operating the network interface card. Communication between the host computing device 300 and other devices may occur using any protocol or mechanism over any wired or wireless connection. In some examples, the communications interface is operable with short range communication technologies such as by using near-field communication (NFC) tags.

The data storage device(s) 318 may be implemented as any type of data storage, including, but without limitation, a hard disk, optical disk, a redundant array of independent disks (RAID), a solid state drive (SSD), a flash memory drive, a storage area network (SAN), or any other type of data storage device. The data storage device(s) 318 may include rotational storage, such as a disk. The data storage device(s) 318 may also include non-rotational storage media, such as SSD or flash memory. In some non-limiting examples, the data storage device(s) 218 provide a shared data store, such as shared data store 242 in FIG. 2.

The host computing device 300) hosts one or more virtual machines, such as virtual machines 320 and 322. The virtual machine 320 includes, among other data, one or more application(s), such as application(s) 324 or 326. The application(s), when executed by the processor(s) 304, operate to perform functionality on the host computing device 3. Exemplary application(s) include, without limitation, mail application programs, web browsers, calendar application programs, address book application programs, messaging programs, media applications, location-based services, search programs, and the like. The application(s) may communicate with counterpart applications or services such as web services accessible via a network. For example, the applications may represent downloaded client-side applications that correspond to server-side services executing in a cloud.

In this example, each virtual machine includes a guest operating system (OS), such as operating system. In this example, virtual machine 320 includes guest OS 328 and virtual machine 322 includes guest OS 330.

The host computing device 300 further includes one or more computer executable components. Exemplary components include a hypervisor 332. The hypervisor 332 is a virtual machine monitor that creates and runs one or more virtual machines, such as, but without limitation, virtual machine 320 or virtual machine 330. In one example, the hypervisor 332 is implemented as a vSphere Hypervisor from VMware, Inc.

The host computing device 300 running the hypervisor 332 is a host machine. Virtual machine 320 is a guest machine. The hypervisor 332 presents the operating system 328 of the virtual machine 320 with a virtual hardware platform. The virtual hardware platform may include, without limitation, virtualized processor 334, memory 336, user interface device 338, and network communication interface 340. The virtual hardware platform, virtual machine(s) and the hypervisor are illustrated and described in more detail in FIG. 17 below.

Figure 4:
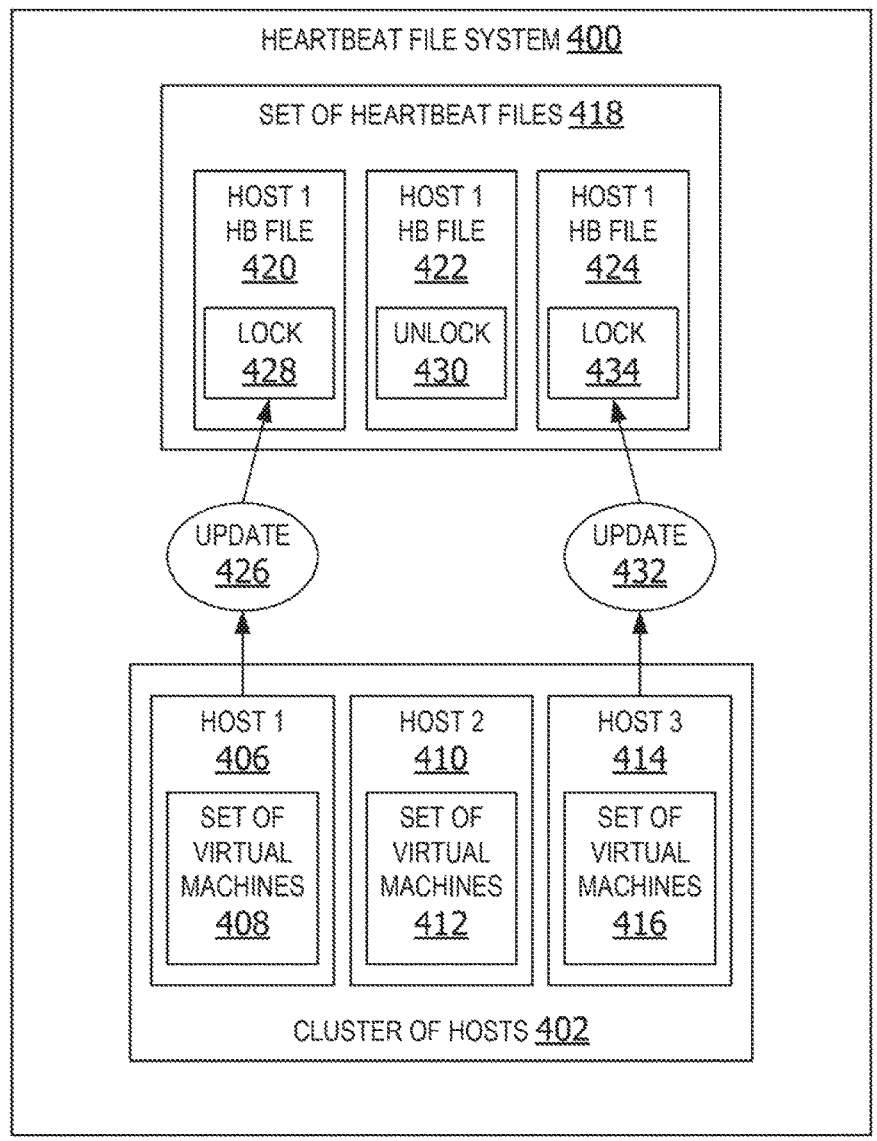
FIG. 4 is a block diagram illustrating a host heartbeat file system in pooled memory.

FIG. 4 is a block diagram illustrating a host heartbeat file system in pooled memory. The heartbeat file system 400 is a filesystem storing heartbeat files for one or more hosts in the plurality of hosts in the cluster of hosts 402 running one or more virtual machines. For example, host 406 serves a set of virtual machines 408, host 410 hosts set of virtual machines 412, and host 414 serves set of virtual machines 416.

Each host in the cluster of hosts 402 creates a host heartbeat file in a set of heartbeat files 418 on the heartbeat file system 400. For example, host 406 is associated with host heartbeat file 420, host 412 is associated with host heartbeat file 422, and host 414 is associated with host heartbeat file 424. In some examples, an agent on the host generates the heartbeat file associated with that host.

Each host sends an update to the heartbeat file associated with that host at an occurrence of an update time interval. In this example, host 406 sends update 426 to host heartbeat file 420 to lock 428 the file. The lock 328 indicates that the host 406 has an active pooled memory heartbeat and/or the host has pooled memory connectivity.

In this example, host 410 fails to send an update at the update time interval. In this example, the heartbeat file 422 for host 410 is unlocked 430. The unlocked pooled memory heartbeat file indicates that the host 410 has lost pooled memory connectivity.

In this example, the host 414 sends an update 432 to the heartbeat file 424 at the update time interval, which maintains the lock 434 on the file. The lock 434 indicates the host 414 has an active pooled memory heartbeat status.

Figure 5:
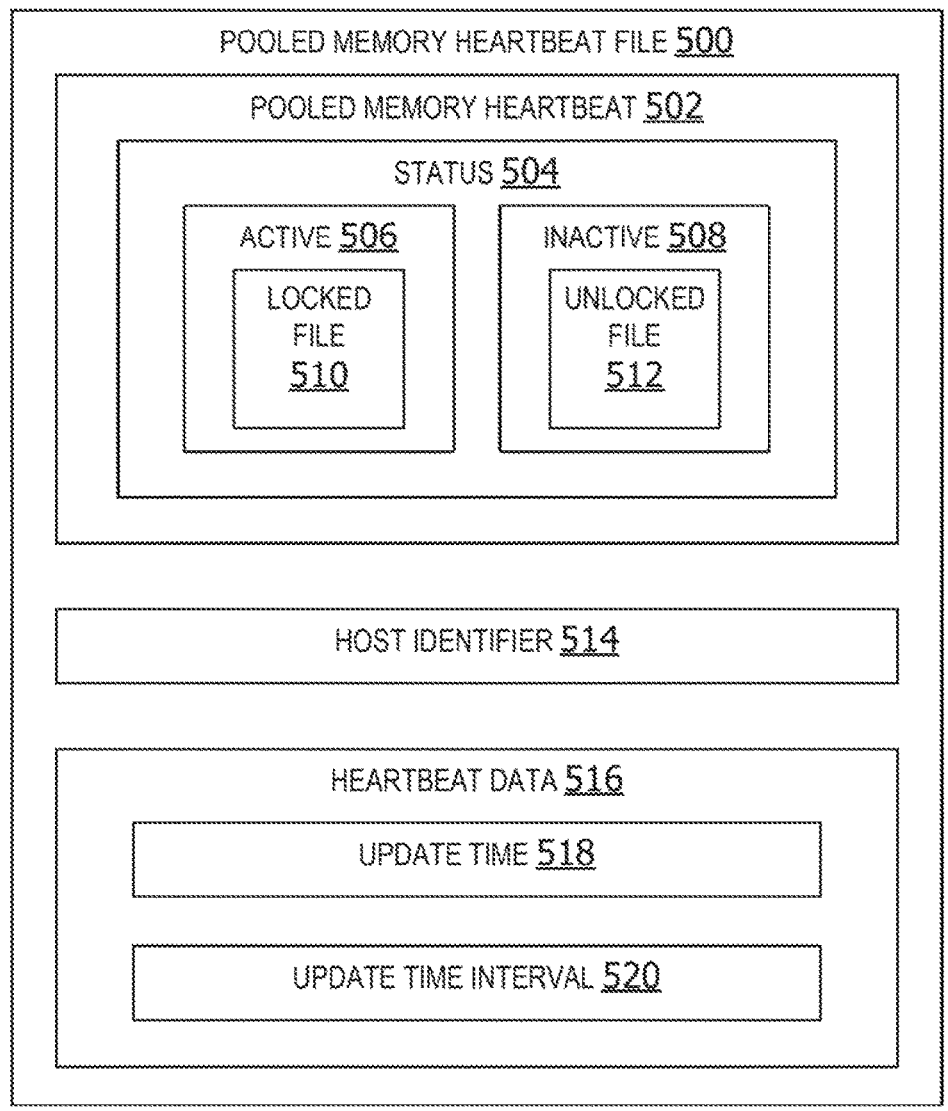
FIG. 5 is a block diagram illustrating a pooled memory heartbeat file in a shared partition on pooled memory.

FIG. 5 is a block diagram illustrating a pooled memory heartbeat file in a shared partition on pooled memory. The pooled memory heartbeat file 500 is a heartbeat file associated with a virtual machine host. The pooled memory heartbeat file 500 is created in a shared partition on the pooled memory. The pooled memory heartbeat 502 indicates whether a pooled memory heartbeat status 504 of the host is active 506 or inactive 508. In this non-limiting example, the active status is indicated by a locked file 510. The inactive status is indicated by an unlocked file 512.

The pooled memory heartbeat file 500 in some examples includes a host identifier 514. The host identifier identifies the host associated with the heartbeat file. If the heartbeat file is unlocked, the master agent checks the host identifier 514 to determine which host has lost pooled memory connectivity.

In other examples, the pooled memory heartbeat file optionally includes other heartbeat data 516, such as, but not limited to, an update time 518 of the last update to the file and/or an update time interval 520 indicating a frequency with which the file is updated to prevent the file from unlocking. If the file is updated at the update time interval, the file remains locked and the pooled memory heartbeat status for the host is active.

Figure 6:
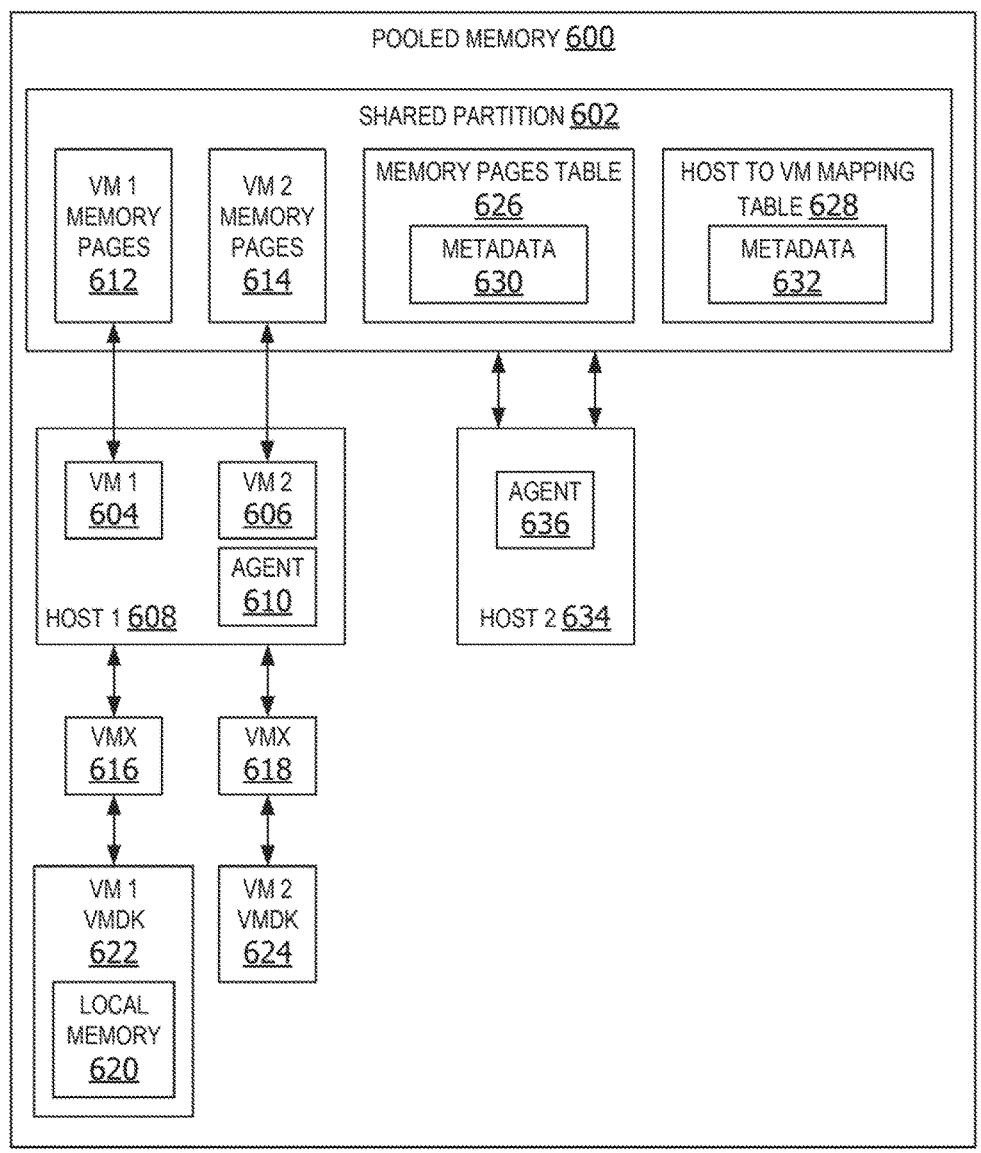
FIG. 6 is a block diagram illustrating a pooled memory for respawning virtual machines.

FIG. 6 is a block diagram illustrating a pooled memory for respawning virtual machines. In this example, the pooled memory 600 stores virtual machine memory pages for virtual machines enabled for respawn from pooled memory, such as virtual machines 604 and 606 running on host 608. An agent 610 on the host 608 maintains the virtual machine memory pages for each virtual machine running on the host. In this example, memory pages 612 includes memory for the virtual machine 604 and memory pages 614 include memory for virtual machine 606. The memory pages 612 in the pooled memory are locked. Even though all hosts have access to the pooled memory, only the virtual machine 604 associated with the memory pages 612 can access, update, modify, or otherwise change the data in memory pages 612. The memory pages 614 are locked such that only virtual machine 606 associated with the memory pages 614 can access, modify, or otherwise change the data in the memory for that particular virtual machine.

Each virtual machine includes configuration data for the virtual machine, such as virtual machine X(VMX) 616 configuration file for virtual machine 604 and VMX 618 configuration file storing configuration data for virtual machine 506. These configuration files are associated with local memory for each virtual machine. For example, local memory 620 for virtual machine 604 is located on virtual machine disk 622 and local memory for virtual machine 606 is associated with virtual machine disk 624. The local memory 620 for virtual machine 604 is inaccessible to virtual machine 606. Likewise, the local memory for virtual machine 606 is inaccessible to virtual machine 604. In this manner, the configuration data and memory for one virtual machine stored in local memory is unavailable to the new host if the virtual machine is respawned on the new host.

To enable the new host to access the virtual machine memory, configuration data, and other data for maintaining virtual machine state on respawning the virtual machine on a new host having access to the pooled memory. The pooled memory is used to store the virtual machine memory pages, configuration data, memory page table 626, host-to-VM mapping table 628, and any other virtual machine data on shared partitions accessible by the new host.

In this non-limiting example, the memory page table 626 includes metadata 630 identifying virtual machine memory locations on the pooled memory for utilization by a new host. In this example, the metadata 630 identifies memory pages 612 belonging to virtual machine 604. The memory page table also includes entries identifying the memory pages 614 created by virtual machine 506 as belonging to virtual machine 606 running on host 608.

The host-to-VM mapping table 628 includes metadata 632 mapping each virtual machine to the host that is currently serving the virtual machine. In this example, the host-to-VM mapping table 628 includes entries mapping virtual machine 604 and 606 to host 608.

In one example, if host 608 becomes isolated or fails, the virtual machines 604 and 506 are respawned on host 636 using the virtual machine memory pages, and memory page table, host-to-VM mapping. This pooled memory virtual machine memory enables the virtual machines to be respawned on the new host without losing the memory state of the virtual machines.

In some examples, each host has its own host-to-VM mapping table. In other examples, a single host-to-VM mapping table contains entries mapping all hosts to the virtual machines running on each host.

In some examples, while the virtual machines 604 and 606 are running on the host 608, the agent 610 on the host maintains a lock on the memory page table 626. In this non-limiting example, a memory page table is associated with each host. If the host becomes isolated or fails, the lock on the memory page table is released to enable the new host 634 to access the metadata 630 on the memory page table 626 identifying the appropriate VM memory on the pooled memory for the virtual machines respawning on the new host. Once the VM respawn is completed successfully, the agent 636 on the new host 634 maintains the locks on the memory page table 626. If the new host 634 should subsequently fail or become isolated, the locks on the memory page table would again be released to permit the another host to access the memory page table and respawn the virtual machines 604 and 606 on that host.

In another example, each virtual machine maintains its own memory page table. In this example, the virtual machine maintains the lock on the memory page table. If the host running the virtual machine becomes isolated or fails, the lock is released to permit the new host to access the memory page table for the virtual machine being respawned on the new host.

In this example, the virtual machine memory pages are placed into shared pooled memory from the very beginning when the virtual machine is configured or powered on. This example has potential issues related to running a virtual machine off of another node's memory.

In another example, the virtual machine memory pages are placed into the pooled memory only when a network partition, such as an isolation event or host failure event, is detected. This would require the source and target hosts to negotiate over the shared partition in the pooled memory. This may also require more time to move the virtual machine to another host but would permit the virtual machine to potentially run faster using only the local memory.

Figure 7:
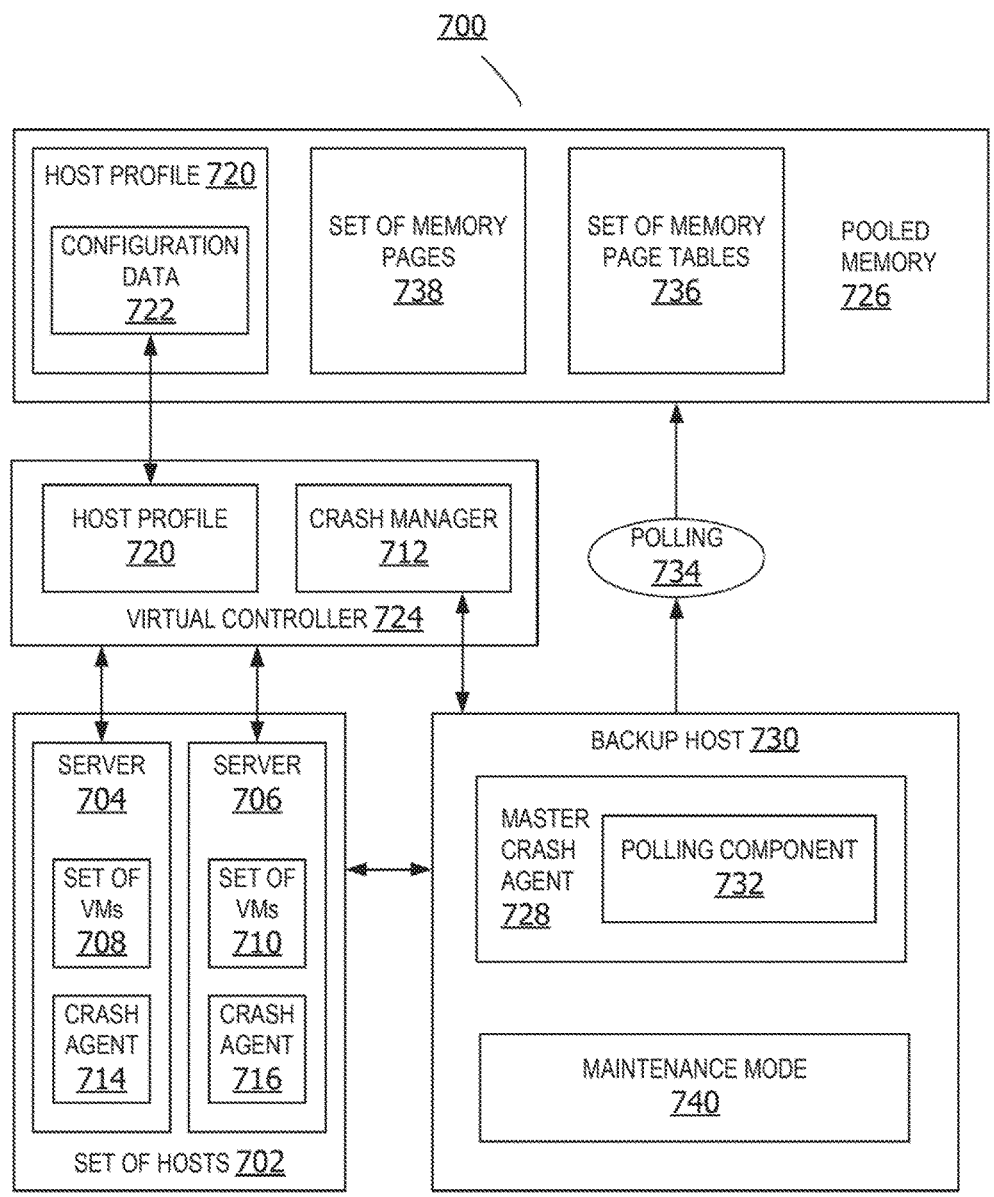
FIG. 7 is a block diagram illustrating a crash agent polling memory page tables on a shared partition in pooled memory.

FIG. 7 is a block diagram illustrating a crash agent polling memory page tables on a shared partition in pooled memory. The pooled memory architecture 700 in this example includes a set of hosts 702, such as, but not limited to, server 704 and server 706. Each server serves a set of virtual machines, such as set of VMs 708 on server 704 and set of VMs 710 on server 706.

A manager 712 pushes a crash agent onto each host in the set of hosts 702. In this example, crash agent 714 is associated with server 704 and crash agent 716 is associated with server 706. Each crash agent maintains a memory page table for the host. When the crash agent updates the memory page table, the memory page table is locked for write access.

Each host in the set of hosts also includes a host profile 720. The host profile 720 captures configuration data 722 for the host. A copy of the host profile 720 is stored on the pooled memory 726.

In some examples, a host profile is created for each host that is serving a virtual machine enabled to resume from pooled memory. The agent on the host updates the host profile in response to a change in a configuration of the host. In other examples, the host profile is updated by the virtual controller in response to a detected change in a configuration of a host associated with a virtual machine enabled to resume from pooled memory.

A master crash agent 728 on a backup host 730 includes a polling component 732 for polling 734 set of memory page tables 736 for write access. If any host fails to update the memory table for that host, the memory page table will be unlocked for write access.

In some examples, if the backup host obtains write access to a memory page table for a host, such as server 704, the master crash agent identifies that host as a failed or isolated host. The master crash agent utilizes the metadata in the memory page table to access the set of memory pages for server 704. The set of virtual machines 708 on the server 704 are quiesced. The set of virtual machines 708 are killed on that host. The master crash agent releases the locks on the set of memory pages 738.

In some examples, the host profile 720 associated with the failed or isolated host is applied to the backup host 730 during the virtual machine respawn process. The maintenance mode 740 is changes to an active mode and the set of virtual machines 708 are respawned on backup host 730. The backup host is the new host for the set of virtual machines 708.

In this example, the maintenance mode is a mode of the backup host prior to re-spawning VMs on the backup host. The maintenance mode may be referred to as a standby mode. During the maintenance mode, the backup host is not actively running any VMs. In a maintenance mode the backup host has access to shared pooled memory but does not have write access to VM memory on the pooled memory.

During the process of respawning VMs on the backup host, the backup host is switched from the maintenance mode to the active mode. In some examples, the active mode is a mode of the backup host during re-spawning or after re-spawning VMs on the backup host. In other words, in some examples, prior to respawning VMs on the backup host, the backup host is in a maintenance mode in which it is not running VMs. When VMs are respawned on the backup host, the backup host becomes a normally functioning VM host running one or more respawned VMs.

While running respawned VMs, the backup host is operating in the active mode indicating the host is actively running one or more VMs. In this example, when operating in active mode, the backup host has read and write access to VM memory and/or memory page table(s) on the pooled memory associated with one or more VMs running on the backup host.

Figure 8:
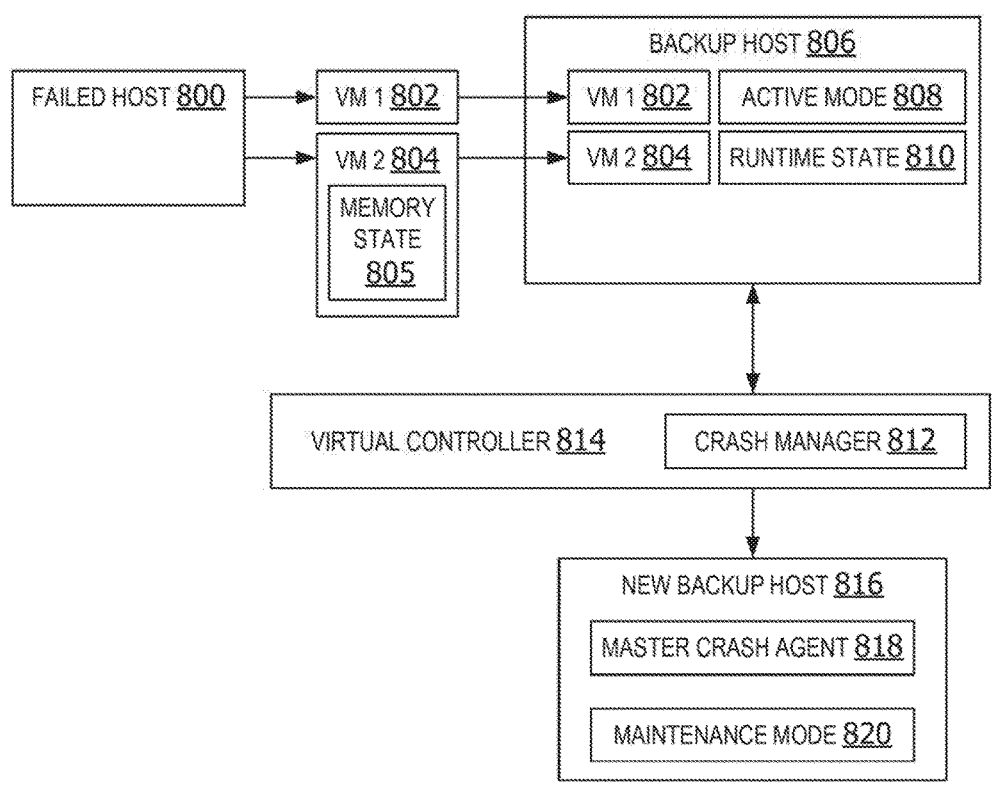
FIG. 8 is a block diagram illustrating respawning virtual machines on a backup host.

FIG. 8 is a block diagram illustrating respawning virtual machines on a backup host. The failed host 800 in this example is a host that is isolated or crashed. An isolated host is a host that is network isolated, lost shared data store connectivity, or lost pooled memory connectivity. In some examples, a crashed host is a host that has lost network connectivity and pooled memory connectivity. In other examples, the crashed host is a host that has lost network connectivity, shared data store connectivity, and pooled memory connectivity.

The virtual machines running on the failed host 800, such as virtual machine 802 and virtual machine 804 are respawned on the backup host 806. In some examples, the backup host may be a backup appliance or a backup host appliance.

The backup host is changed from a maintenance mode to an active mode 808. The virtual machine memory in pooled memory is accessed by the backup host to maintain memory state 805 and runtime state 810 of the virtual machines.

When the virtual machines are successfully respawned on the backup host, the crash manager 812 running on the virtual controller 814 in this non-limiting example creates a new backup host 816. The new backup host 816 is placed in a maintenance mode. A master crash agent 818 on the new backup host 816 polls the memory page tables on the pooled memory for write access. In other words, the master agent polls the set of memory page tables in an attempt to obtain write access to at least one memory page table in the set of memory page tables. If the new backup host 816 obtains the write access to a memory page table for any host, the virtual machines running on that host are respawned on the new backup host 816.

Figure 9:
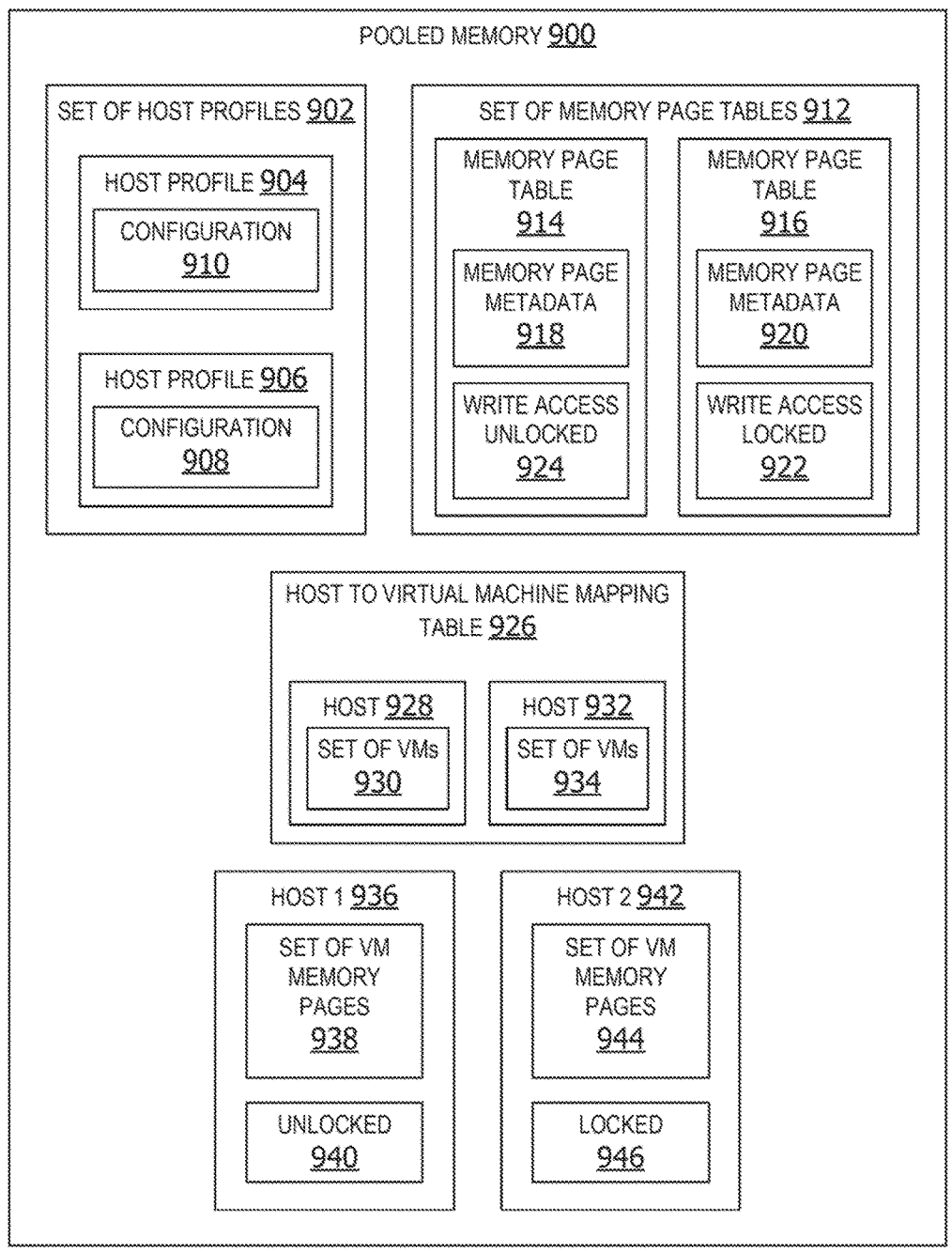
FIG. 9 is a block diagram illustrating a pooled memory including host data and virtual machine data.

FIG. 9 is a block diagram illustrating a pooled memory including host data and virtual machine data. The pooled memory 900 in some non-limiting examples includes a set of host profiles. The set of host profiles 902 in this example includes a host profile for one or more hosts, such as host profile 904 and host profile 906. In some examples, each host profile may be stored in a separated shared partition on pooled memory. In other examples, two or more host profiles are stored in the same shared partition. The host profile includes configuration data for a host, such as configuration 908 in host profile 906 and configuration 910 in host profile 904.

In other examples, the pooled memory 900 includes a set of memory page tables 912. The set of memory page tables 912 includes one or more memory page tables, such as memory page table 914 and memory page table 916. Memory page table 914 in this example is associated with at least one virtual machine. The memory page table 914 includes memory page metadata. The memory page metadata identifies one or more memory pages for the virtual machine. The memory page table may be locked or unlocked. In this example, the memory page table 914 is write access unlocked 924. If a master crash agent polls the memory page table 914 for write access, the master crash agent will obtain write access to the memory page table. In this example, the one or more virtual machines associated with the memory page table 914 are respawned on a new host using the memory page metadata 918.

The memory page table 916 includes memory page metadata 920. The memory page metadata identifies one or more virtual memory pages in pooled memory associated with one or more virtual machines. In this examples, the memory page table 916 is write access locked 922. If a master crash agent polls the memory page table 916 for write access, the master crash agent will be unable to obtain write access. In this examples, the virtual machines associated with memory page table are not respawned on a new host.

In other examples, the pooled memory 900 includes at least one host to virtual machine mapping table 926. The host-to-VM mapping table 926 maps hosts to virtual machines. For example, host 928 is mapped to a set of virtual machines 930 running on the host 928. The host 932 to mapped to a different set of virtual machines 934 running on host 932.

In still other examples, the pooled memory 900 includes one or more shared partitions for virtual machine memory pages. For example, shared partition 936 includes a set of virtual machine memory pages 938 associated with a first virtual machine and set of virtual machine memory pages 944 associated with a second virtual machine on shared partition 942.

In some examples, the set of virtual machine memory pages includes a lock. The lock prevents one host from accessing or modifying the set of memory pages for a virtual machine running on a different host. In this non-limiting example, set of virtual machine memory pages 938 is unlocked 940 and the set of virtual machine memory pages 944 is locked 946.

Figure 10:
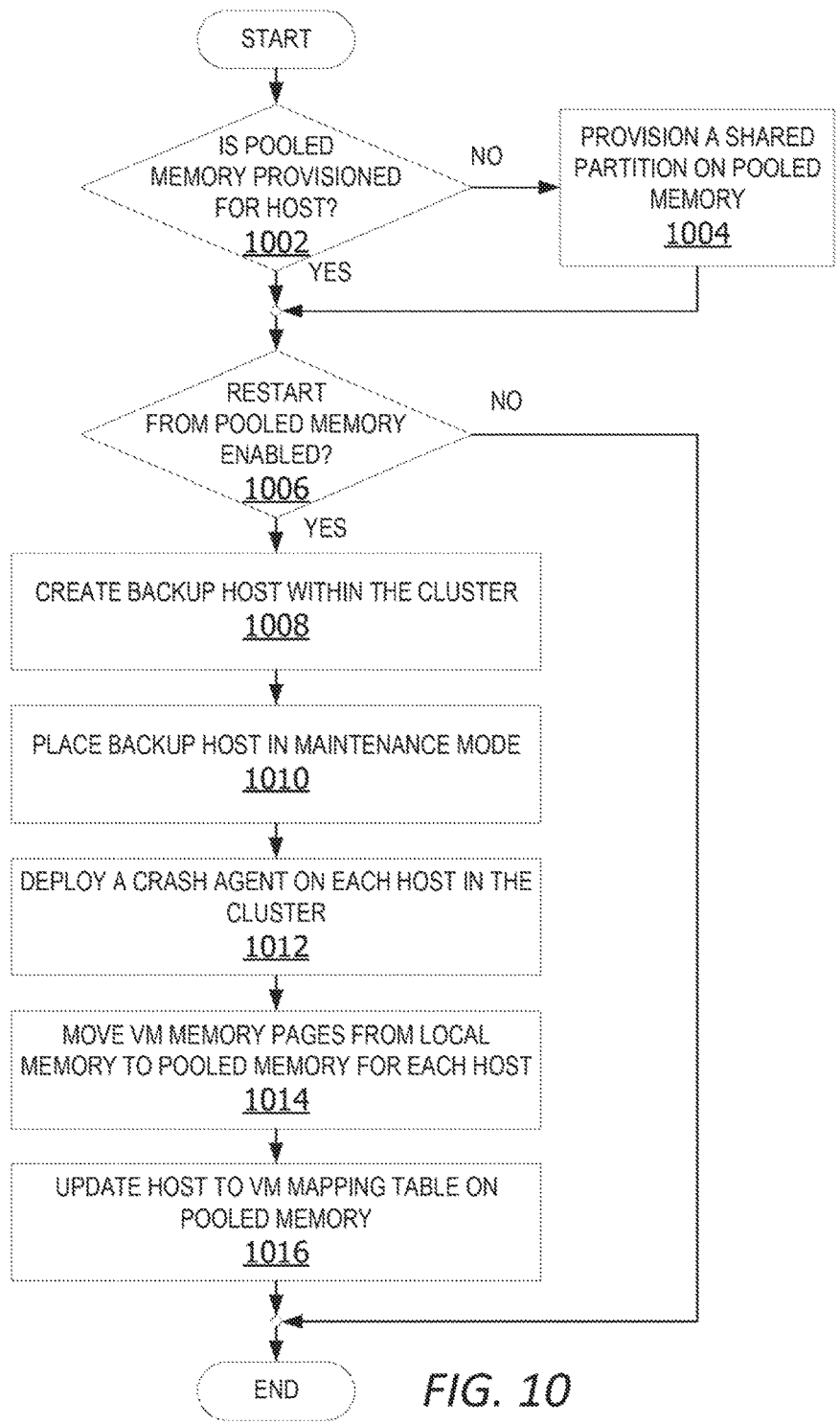
FIG. 10 is a flowchart of a process for configuration of pooled memory for respawning virtual machines.

FIG. 10 is a flowchart of a process for configuration of pooled memory for respawning virtual machines. The process shown in FIG. 10 may be performed by a server or virtual controller, such as, but not limited to, virtual controller 244 in FIG. 2, virtual controller 724 in FIG. 7, or virtual controller 814 in FIG. 8. Further, execution of the operations illustrated in FIG. 10 is not limited to a virtual controller. One or more computer-readable storage media storing computer-readable instructions may execute to cause at least one processor to implement the operations illustrated in FIG. 10.

A determination is made as to whether a pooled memory is provisioned for a host at 1002. If no, a shared partition is provisioned on pooled memory at 1004. A determination is made as to whether respawn from pooled memory is enabled at 1006. If no, the process terminates thereafter. If respawn from pooled memory is enabled, a backup host is created within the cluster at 1008. The backup host is placed in maintenance mode. A crash agent is deployed on each host in the cluster 1012. The virtual machine memory pages are moved from local memory to pooled memory. The host-to-VM mapping table on pooled memory is updated at 1016 with metadata regarding the virtual machine memory pages. The process terminates thereafter.

While the operations illustrated in FIG. 10 are described as being performed by a host computing device or a server, aspects of the disclosure contemplate that performance of the operations by other entities. For example, a cloud service may perform one or more of the operations.

Figure 11:
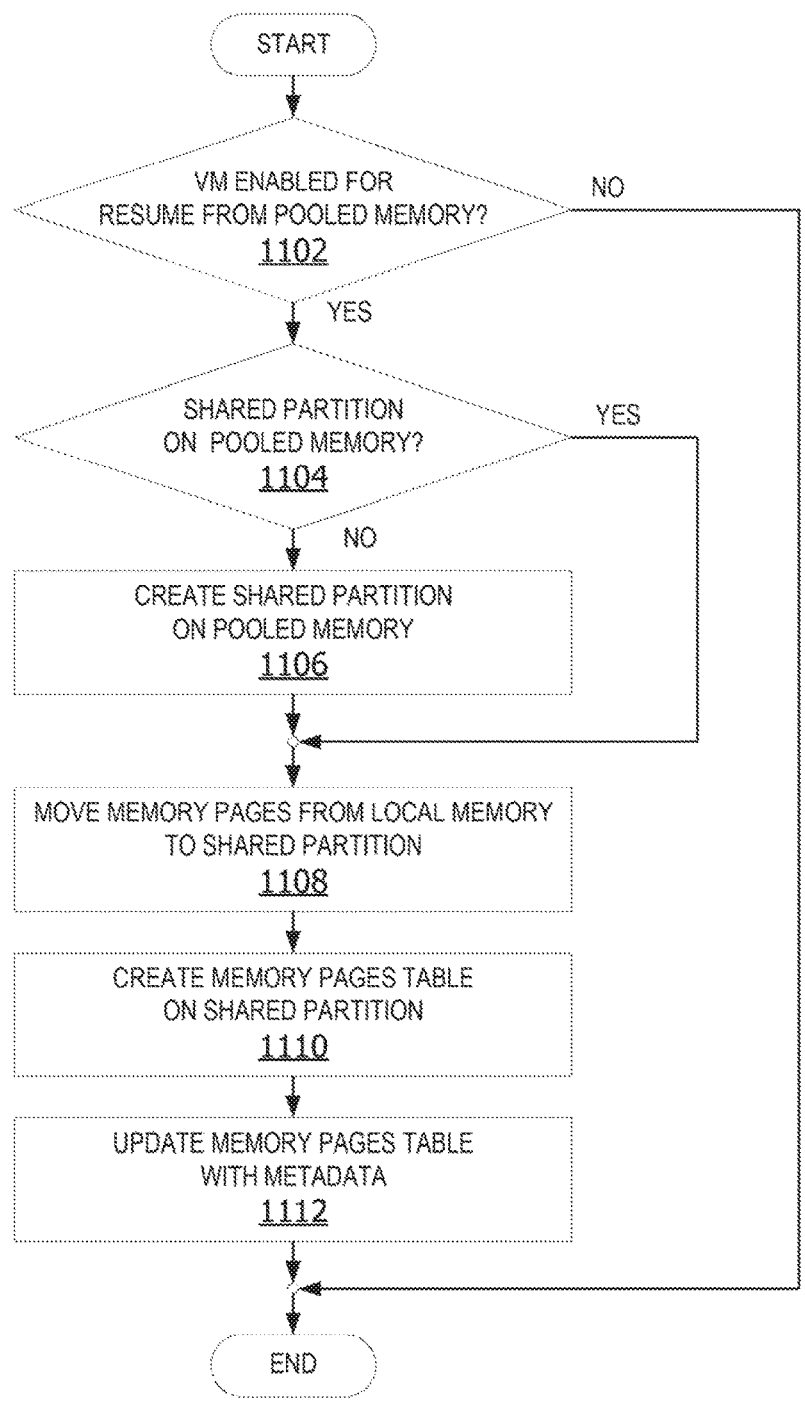
FIG. 11 is a flowchart of a process for configuration of pooled memory for respawning virtual machines.

FIG. 11 is a flowchart of a process for configuration of pooled memory for respawning virtual machines. The process shown in FIG. 11 may be performed by a server or virtual controller, such as, but not limited to, virtual controller 244 in FIG. 2, virtual controller 724 in FIG. 7, or virtual controller 814 in FIG. 8. Further, execution of the operations illustrated in FIG. 10 is not limited to a virtual controller. One or more computer-readable storage media storing computer-readable instructions may execute to cause at least one processor to implement the operations illustrated in FIG. 11.

A determination is made as to whether a virtual machine is enabled for resume from pooled memory at 1102. If no, the process terminates. If the virtual machine is enabled for resume from pooled memory, a determination is made as to whether there is a shared partition on pooled memory at 1104. If no, a shared partition is created on pooled memory at 1106. Memory pages are moved from local memory to the shared partition at 1108. A memory page table is created on shared partition at 1110. The memory page table is updated with metadata describing the memory pages for the virtual machine at 1112. The process terminates thereafter.

While the operations illustrated in FIG. 11 are described as being performed by a host computing device or a server, aspects of the disclosure contemplate that performance of the operations by other entities. For example, a cloud service may perform one or more of the operations.

Figure 12:
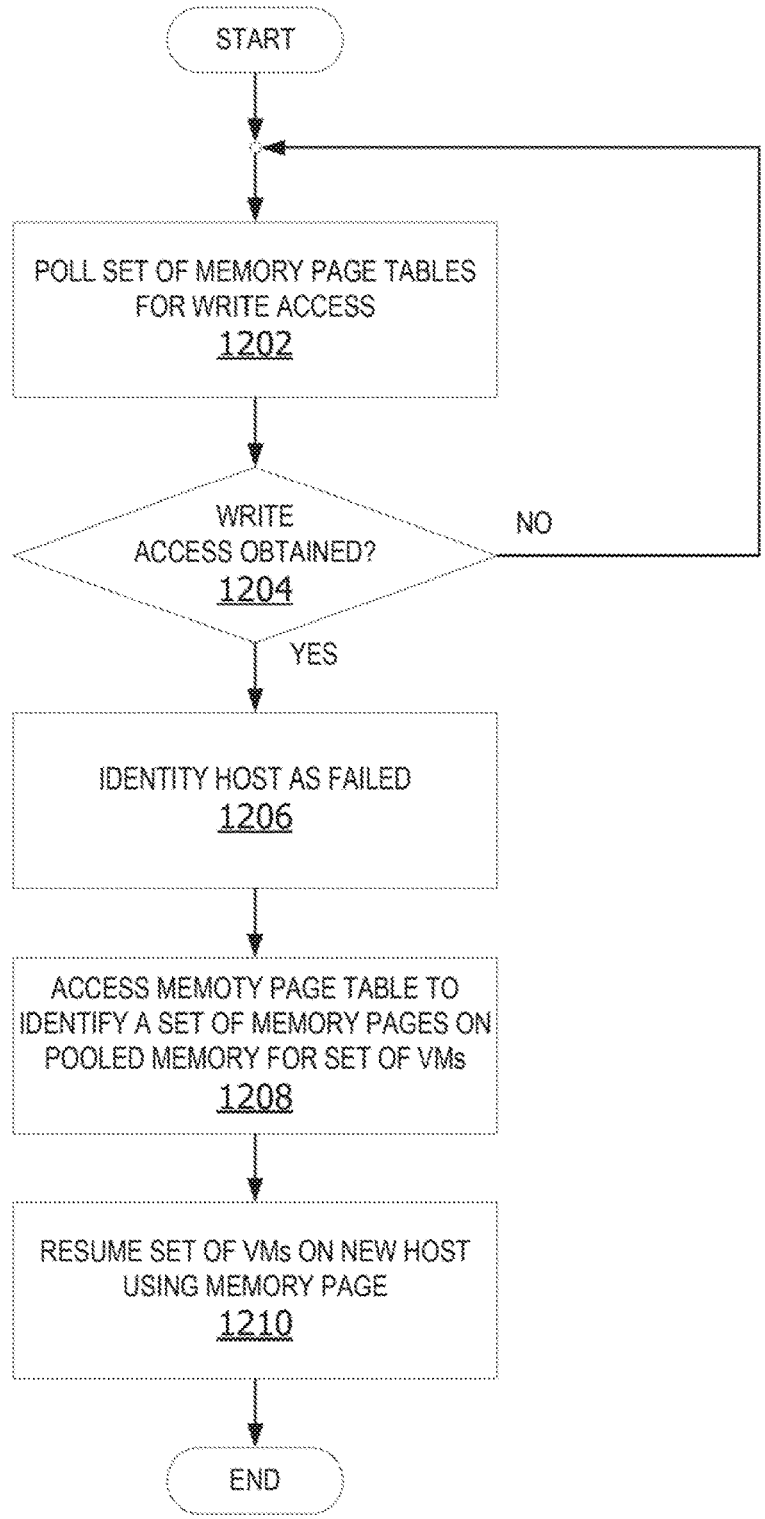
FIG. 12 is a flowchart of a process for polling memory page tables for write access.

FIG. 12 is a flowchart of a process for polling memory page tables for write access. The process shown in FIG. 12 may be performed by an agent on a virtual machine host, such as, but not limited to, host 210 in FIG. 2, host computing device 300 in FIG. 3, host 406 in FIG. 4, host 608 in FIG. 6, or server 704 in FIG. 7. Further, execution of the operations illustrated in FIG. 12 is not limited to a virtual controller. One or more computer-readable storage media storing computer-readable instructions may execute to cause at least one processor to implement the operations illustrated in FIG. 12.

A master crash agent polls a set of memory page tables for write access at 1202. A determination is made as to whether write access to a memory page table is obtained at 1204. If yes, the host is identified as failed at 1206. The memory page table is accessed to identify a set of memory pages on pooled memory for set of virtual machines at 1208. The set of virtual machines is resumed on a new host using the memory pages on pooled memory at 1210. The process terminates thereafter.

While the operations illustrated in FIG. 12 are described as being performed by a host computing device or a server, aspects of the disclosure contemplate that performance of the operations by other entities. For example, a cloud service may perform one or more of the operations.

Figure 13:
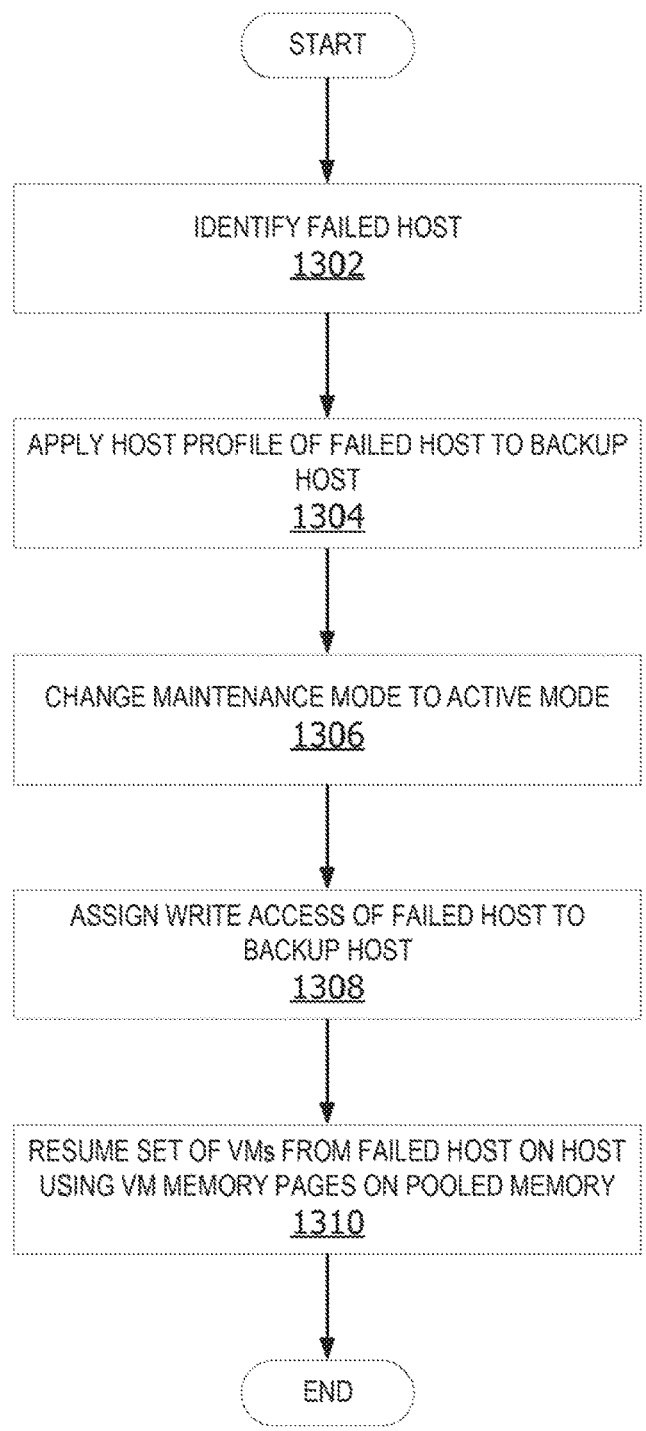
FIG. 13 is a flowchart of a process for respawing a virtual machine on a backup host.

FIG. 13 is a flowchart of a process for respawning a virtual machine on a backup host. The process shown in FIG. 13 may be performed by a master crash agent on a virtual machine host, such as, but not limited to, host 210 in FIG. 2, host computing device 300 in FIG. 3, host 406 in FIG. 4, host 608 in FIG. 6, or server 704 in FIG. 7. Further, execution of the operations illustrated in FIG. 13 is not limited to a virtual controller. One or more computer-readable storage media storing computer-readable instructions may execute to cause at least one processor to implement the operations illustrated in FIG. 13.

The process identifies a failed host at 1302. A host profile of the failed host is applied to a backup host at 1304. A maintenance mode of the backup host is changed to an active mode at 1306. A write access of the failed host is assigned to a backup host at 1308. The set of virtual machines from the failed host is resumed on the backup host using the virtual machine pages on pooled memory at 1310. The process terminates thereafter.

While the operations illustrated in FIG. 13 are described as being performed by a host computing device or a server, aspects of the disclosure contemplate that performance of the operations by other entities. For example, a cloud service may perform one or more of the operations.

Figure 14:
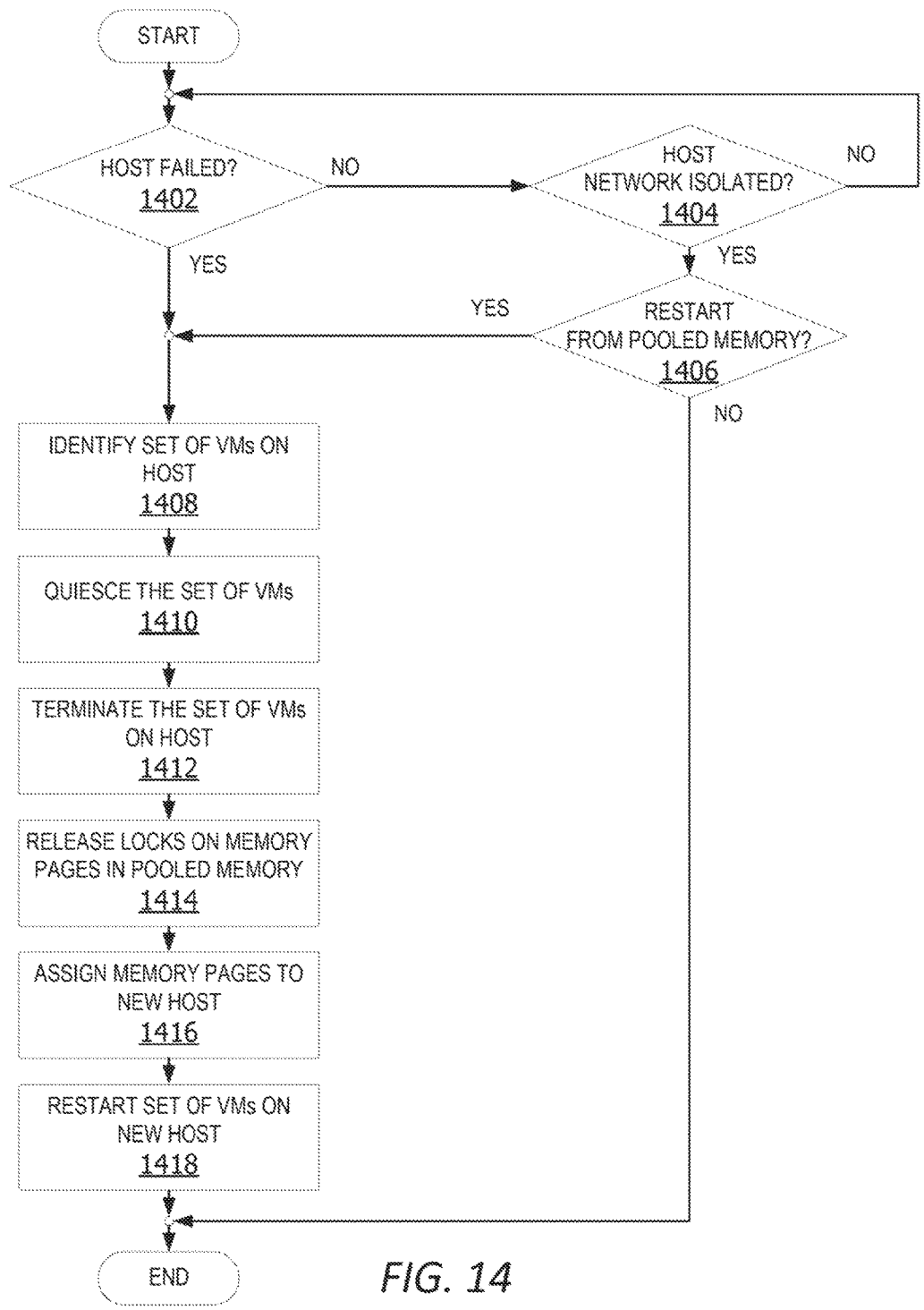
FIG. 14 is a flowchart of a process for respawning a set of virtual machines on a new host.

FIG. 14 is a flowchart of a process for respawning a set of virtual machines on a new host. The process shown in FIG. 14 may be performed by a master crash agent on a virtual machine host, such as, but not limited to, host 210 in FIG. 2, host computing device 300 in FIG. 3, host 406 in FIG. 4, host 608 in FIG. 6, or server 704 in FIG. 7. Further, execution of the operations illustrated in FIG. 14 is not limited to a virtual controller. One or more computer-readable storage media storing computer-readable instructions may execute to cause at least one processor to implement the operations illustrated in FIG. 14.

A determination is made as to whether a host is failed at 1402. If no, a determination is made as to whether a host is network isolated at 1404. If no, the process terminates thereafter.

Returning to 1404, if the host is network isolated, a determination is made as to whether to respawn the host from pooled memory at 1406. If the host is failed at 1402 or a network isolated host is to be respawned from pooled memory, a set of virtual machines on the host are identified at 1408. The set of virtual machines are quiesced at 1410. The set of virtual machines are terminated on the host at 1412. The locks on the memory pages in pooled memory are released at 1414. The memory pages are assigned to a new host at 1416. The set of virtual machines are respawned on the new host at 1418. The process terminates thereafter.

While the operations illustrated in FIG. 14 are described as being performed by a host computing device or a server, aspects of the disclosure contemplate that performance of the operations by other entities. For example, a cloud service may perform one or more of the operations.

Figure 15:
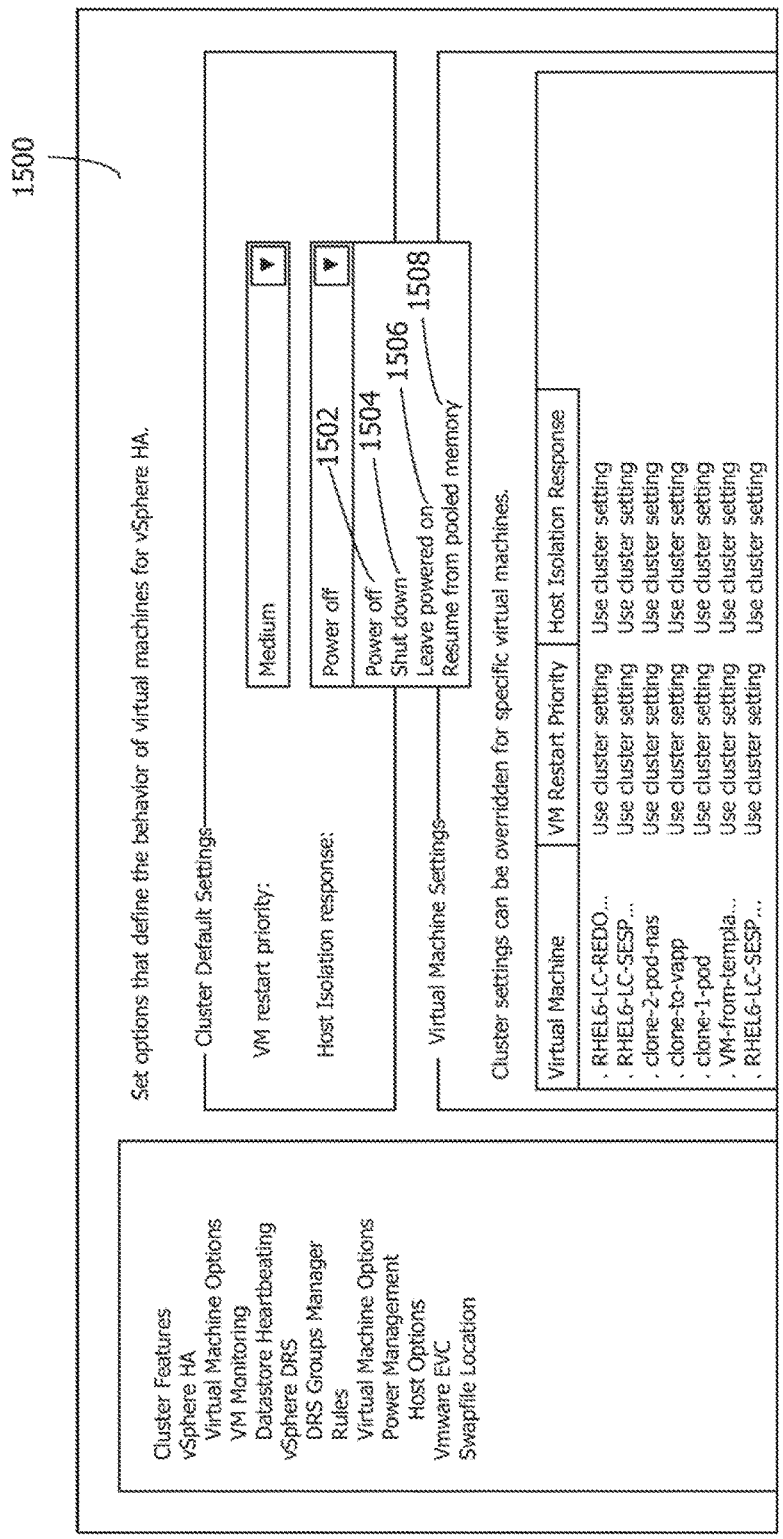
FIG. 15 is an exemplary user interface for enabling resume from pooled memory for a virtual machine.

FIG. 15 is an exemplary user interface for enabling resume from pooled memory for a virtual machine. The user interface 1500 in this example includes a menu permitting a user to select options for host isolation response. A user may select to power off the virtual machine 1502, shut down the virtual machine 1504, leave the virtual machine powered on 1506, or resume the virtual machine form pooled memory at 1508.

Figure 16:
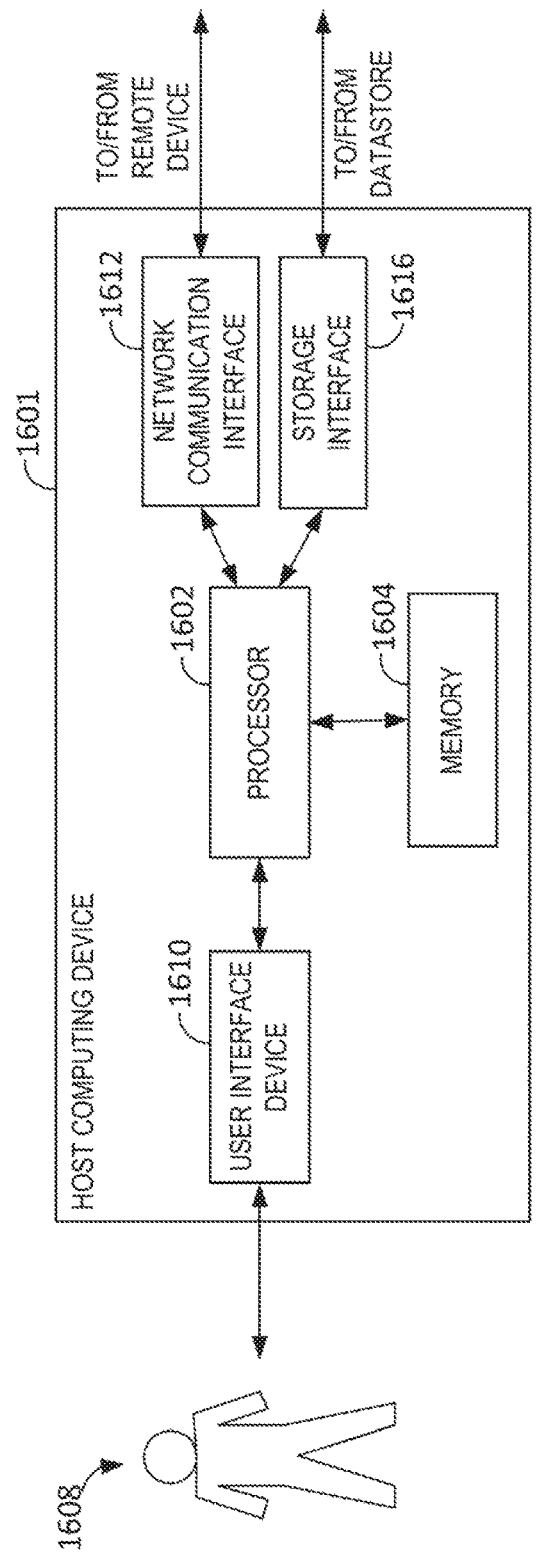
FIG. 16 is a block diagram of an exemplary host computing device.

FIG. 16 is a block diagram of an example host computing device 1601. Host computing device 1601 includes a processor 1602 for executing instructions. In some examples, executable instructions are stored in a memory 1604. Memory 1604 is any device allowing information, such as executable instructions and/or other data, to be stored and retrieved. For example, memory 1604 may include one or more random access memory (RAM) modules, flash memory modules, hard disks, solid state disks, and/or optical disks.

Host computing device 1601 may include a user interface device 1610 for receiving data from a user 1608 and/or for presenting data to user 1608. User 1608 may interact indirectly with host computing device 1601 via another computing device such as VMware's vCenter Server or other management device. User interface device 1610 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 1610 operates to receive data from user 1608, while another device (e.g., a presentation device) operates to present data to user 1608. In other examples, user interface device 1610 has a single component, such as a touch screen, that functions to both output data to user 1608 and receive data from user 1608. In such examples, user interface device 1610 operates as a presentation device for presenting information to user 1608. In such examples, user interface device 1610 represents any component capable of conveying information to user 1608. For example, user interface device 1610 may include, without limitation, a display device (e.g., a liquid crystal display (LCD), organic light emitting diode (OLED) display, or "electronic ink" display) and/or an audio output device (e.g., a speaker or headphones). In some examples, user interface device 1610 includes an output adapter, such as a video adapter and/or an audio adapter. An output adapter is operatively coupled to processor 1602 and configured to be operatively coupled to an output device, such as a display device or an audio output device.

Host computing device 1601 also includes a network communication interface 1712, which enables host computing device 1601 to communicate with a remote device (e.g., another computing device) via a communication medium, such as a wired or wireless packet network. For example, host computing device 1701 may transmit and/or receive data via network communication interface 1612. User interface device 1610 and/or network communication interface 1612 may be referred to collectively as an input interface and may be configured to receive information from user 1608.

Host computing device 1601 further includes a storage interface 1616 that enables host computing device 1601 to communicate with one or more data stores, which store virtual disk images, software applications, and/or any other data suitable for use with the methods described herein. In example examples, storage interface 1616 couples host computing device 1601 to a storage area network (SAN) (e.g., a Fibre Channel network) and/or to a network-attached storage (NAS) system (e.g., via a packet network). The storage interface 1616 may be integrated with network communication interface 1612.

Figure 17:
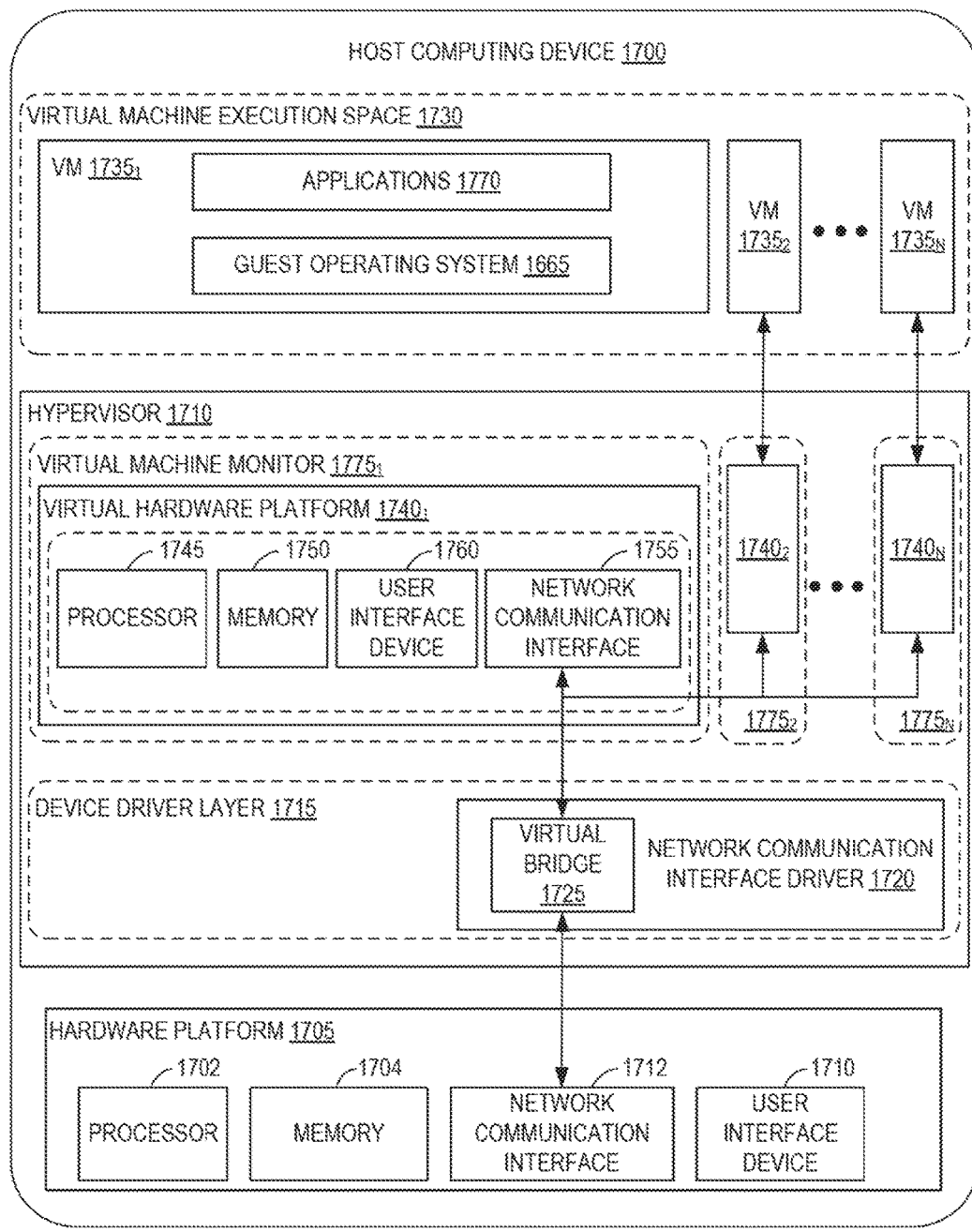
FIG. 17 is a block diagram of virtual machines that are instantiated on host computing device.

FIG. 17 depicts a block diagram of virtual machines $1735_1$, $1735_2$ . . . $1735_N$ that are instantiated on host computing device 1601. Host computing device 1601 includes a hardware platform 1705, such as an x86 architecture platform. Hardware platform 1705 may include processor 1602, memory 1604, network communication interface 1612, user interface device 1610, and other input/output (I/O) devices. A virtualization software layer is installed on top of hardware platform 1705. The virtualization software layer in this example includes a hypervisor 1710.

The virtualization software layer supports a virtual machine execution space 1830 within which multiple virtual machines (VMs $1735_1$-$1735_N$) may be concurrently instantiated and executed. Hypervisor 1710 includes a device driver layer 1715, and maps physical resources of hardware platform 1705 (e.g., processor 1602, memory 1604, network communication interface 1612, and/or user interface device 1610) to "virtual" resources of each of VMs $1735_1$-$1735_N$ such that each of VMs $1735_1$-$1735_N$ has its own virtual hardware platform (e.g., a corresponding one of virtual hardware platforms $1740_1$-$1740_N$), each virtual hardware platform having its own emulated hardware (such as a processor 1745, a memory 1750, a network communication interface 1755, a user interface device 1760 and other emulated I/O devices in VM $1735_1$). Hypervisor 1710 may manage (e.g., monitor, initiate, and/or terminate) execution of VMs $1735_1$-$1735_N$ according to policies associated with hypervisor 1810, such as a policy specifying that VMs $1735_1$-$1735_N$ are to be automatically respawned upon unexpected termination and/or upon initialization of hypervisor 1710. In addition, or alternatively, hypervisor 1710 may manage execution VMs $1735_1$-$1735_N$ based on requests received from a device other than host computing device 1601. For example, hypervisor 1710 may receive an execution instruction specifying the initiation of execution of first VM $1735_1$ from a management device via network communication interface 1612 and execute the execution instruction to initiate execution of first VM $1735_1$.

In some examples, memory 1650 in first virtual hardware platform $1640_1$ includes a virtual disk that is associated with or "mapped to" one or more virtual disk images stored on a disk (e.g., a hard disk or solid state disk) of host computing device 1601. The virtual disk image represents a file system (e.g., a hierarchy of directories and files) used by first VM $1735_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 1715 includes, for example, a communication interface driver 1820 that interacts with network communication interface 1612 to receive and transmit data from, for example, a local area network (LAN) connected to host computing device 1601. Communication interface driver 1720 also includes a virtual bridge 1725 that simulates the broadcasting of data packets in a physical network received from one communication interface (e.g., network communication interface 1612) to other communication interfaces (e.g., the virtual communication interfaces of VMs $1735_1$-$1735_N$). Each virtual communication interface for each VM $1735_1$-$1735_N$, such as network communication interface 1755 for first VM $1735_1$, may be assigned a unique virtual Media Access Control (MAC) address that enables virtual bridge 1725 to simulate the forwarding of incoming data packets from network communication interface 1612. In an example, network communication interface 1612 is an Ethernet adapter that is configured in "promiscuous mode" such that all Ethernet packets that it receives (rather than just Ethernet packets addressed to its own physical MAC address) are passed to virtual bridge 1725, which, in turn, is able to further forward the Ethernet packets to VMs $1735_1$-$1735_N$. This configuration enables an Ethernet packet that has a virtual MAC address as its destination address to properly reach the VM in host computing device 1601 with a virtual communication interface that corresponds to such virtual MAC address.

Virtual hardware platform $1740_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1865 in order to execute applications 1770 for an instantiated VM, such as first VM $1735_1$. Virtual hardware platforms $1740_1$-$1740_N$ may be considered to be part of virtual machine monitors (VMM) $1775_1$-$1875_N$ that implement virtual system support to coordinate operations between hypervisor 1710 and corresponding VMs $1735_1$-$1735_N$. Those with ordinary skill in the art will recognize that the various terms, layers, and categorizations used to describe the virtualization components in FIG. 17 may be referred to differently without departing from their functionality or the spirit or scope of the disclosure. For example, virtual hardware platforms $1740_1$-$1740_N$ may also be considered to be separate from VMMs $1775_1$-$1775_N$, and VMMs $1775_1$-$1775_N$ may be considered to be separate from hypervisor 1710. One example of hypervisor 1710 that may be used in an example of the disclosure is included as a component in VMware's ESX brand software, which is commercially available from VMware, Inc.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In the foregoing examples, VMs are used as an example for the containers and hypervisors as an example for the hardware abstraction layer. Each VM generally includes a guest operating system in which at least one application runs. It should be noted that these examples may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices. In some examples, the computing system environment includes a first computer system at a first site and/or a second computer system at a second site. The first computer system at the first site in some non-limiting examples executes program code, such as computer readable instructions stored on non-transitory computer readable storage medium.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for recovering virtual machines using pooled memory. For example, the elements illustrated in FIG. 1, FIG. 2, FIG. 3, FIG. 6, FIG. 7, and FIG. 8, such as when encoded to perform the operations illustrated in FIG. 10, FIG. 11, FIG. 12, FIG. 13, and FIG. 14, constitute exemplary means for polling a set of memory page table for write access, exemplary means for identifying a failed host on obtaining write access to a memory page table for the failed host, and exemplary means for resuming a set of virtual machines from the failed host onto a new host using virtual machine memory pages in a shared partition on pooled memory.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for virtual machine recovery using pooled memory accessible by a plurality of virtual machine hosts, the method comprising:

polling a set of memory page tables in the pooled memory for write access, by a master agent running on a first host in the plurality of virtual machine hosts, the master agent polls the set of memory page tables in an attempt to obtain write access to at least one memory page table in the set of memory page tables;

on obtaining write access to a memory page table associated with a second host in the plurality of hosts, identifying the second host as a failed host, the second host comprising a set of virtual machines associated with the second host; and resuming the set of virtual machines on the first host using memory page table metadata.

2. The method of claim 1, wherein the first host is a backup host in a maintenance mode, and further comprising:

on determining the second host is failed, changing the backup host from the maintenance mode to an active mode and respawning the set of virtual machines on the backup host, wherein the master agent determines the second host is a failed host if the memory page table associated with the second host is unlocked such that the master agent is able to obtain write access to the memory page table during polling of the set of memory page tables; and creating a new backup host within the plurality of virtual machine hosts, the new backup is operating in the maintenance mode.

3. The method of claim 1, further comprising:

deploying a crash agent on each host in the plurality of virtual machine hosts, by a crash manager associated with a virtual controller, wherein the crash agent for a given host updates the memory page table associated with the given host to maintain a write access lock on the memory page table, wherein a failure of the crash agent to update the memory page table within an update time interval permits the first host to obtain the write access to the memory page table.

4. The method of claim 1, further comprising:

on identifying a change in a configuration of a given host in the plurality of virtual machine hosts, updating a host profile for the given host on pooled memory, the host profile is maintained in at least one shared partition in the pooled memory.

5. The method of claim 1, further comprising:

applying a host profile associated with the second host to the first host, wherein the host profile of the second host comprises configuration data for the second host; and on determining the set of virtual machines are successfully resumed on the first host, updating at least one host profile in a set of host, profile.

6. The method of claim 1, wherein resuming the set of virtual machines on the first host using the set of memory page tables metadata further comprises:

terminating the set of virtual machines on the second host;

releasing locks on virtual machine memory pages associated with the set of virtual machines, the virtual machine memory pages located on at least one shared partition in pooled memory;

assigning the virtual machine memory pages to the first host; and respawning the set of virtual machines on the first host using the virtual machine memory pages and the memory page table to maintain a memory state of the virtual machines from the second host to the first host.

7. The method of claim 1, further comprising:
creating a virtual machine shared partition on the pooled memory for a selected virtual machine in the set of virtual machines;
moving memory pages from a local memory of the selected virtual machine to the shared partition; and
updating a selected virtual machine memory page table with metadata associated with the memory pages in the virtual machine shared partition.

8. A computer system comprising:
a memory device providing pooled memory accessible by a plurality of virtual machine hosts, the pooled memory comprising at least one shared partition;
a processor; and
a non-transitory computer readable medium having stored thereon program code for transferring data to another computer system, the program code causing the processor to:
poll a set of memory page tables in the pooled memory for write access, by a master agent running on a first host in the plurality of virtual machine hosts, the master agent polls the set of memory page tables in an attempt to obtain write access to at least one memory page table in the set of memory page tables;
on obtaining write access to a memory page table associated with a second host in the plurality of virtual machine hosts, identify the second host as a failed host, the second host comprising a set of virtual machines associated with the second host; and
resume the set of virtual machines on the first host using memory page table metadata.

9. The computer system of claim 8, wherein a backup host is a first backup host and further comprising:
a maintenance mode of the backup host, wherein the program code further causes the processor to:
change the backup host from the maintenance mode to an active mode and respawning the set of virtual machines on the backup host on determining the second host is failed, wherein the master agent determines the second host is a failed host if the memory page table associated with the second host is unlocked such that the master agent is able to obtain write access to the memory page table during polling of the set of memory page tables; and
create a second backup host within the plurality of hosts, the second backup host is a new backup operating in the maintenance mode.

10. The computer system of claim 8, further comprising:
a crash manager associated with a virtual controller, wherein the program code further causes the processor to:
deploy a crash agent on each host in the plurality of hosts, by the crash manager, wherein the crash agent for a given host updates the memory page table associated with the given host to maintain a write access lock on the memory page table, wherein a failure of the crash agent to update the memory page table within an update time interval permits the first host to obtain the write access to the memory page table.

11. The computer system of claim 8 further comprising:
a configuration of a given host in the plurality of hosts, wherein the program code further causes the processor to:
update a host profile for the given host on pooled memory on identifying a change in the configuration of the given host, the host profile is maintained in at least one shared partition in the pooled memory.

12. The computer system of claim 8 further comprising:
a set of host profiles, wherein the program code further causes the processor to:
apply a host profile associated with the second host to the first host, wherein the host profile of the second host comprises configuration data for the second host; and
on determining the set of virtual machines are successfully resumed on the first host, update at least one host profile in the set of host profiles.

13. The computer system of claim 8, wherein the program code further causes the processor to:
terminate the set of virtual machines on the second host;
release locks on virtual machine memory pages associated with the set of virtual machines, the virtual machine memory pages located on at least one shared partition in pooled memory;
assign the virtual machine memory pages to the first host; and
respawn the set of virtual machines on the first host using the virtual machine memory pages and the memory page table to maintain a memory state of the virtual machines from the second host to the first host.

14. The computer system of claim 8, wherein the program code further causes the processor to:
create a virtual machine shared partition on the pooled memory for a selected virtual machine in the set of virtual machines;
move memory pages from a local memory of the selected virtual machine to the shared partition; and
update a selected virtual machine memory page table with metadata associated with the memory pages in the virtual machine shared partition.

15. A non-transitory computer readable storage medium having stored thereon program code executable by a first computer system at a first site, the program code embodying a method comprising:
polling a set of memory page tables in the pooled memory for write access, by a master agent running on a first host in the plurality of virtual machine hosts, the master agent polls the set of memory page tables in an attempt to obtain write access to at least one memory page table in the set of memory page tables;
on obtaining write access to a memory page table associated with a second host in the plurality of hosts, identifying the second host as a failed host, the second host comprising a set of virtual machines associated with the second host; and
resuming the set of virtual machines on the first host using memory page table metadata.

16. The non-transitory computer readable storage medium of claim 15, wherein the program code embodying the method further comprises:
changing a backup host from a maintenance mode to an active mode and respawning the set of virtual machines on the backup host on determining the second host is failed, wherein the master agent determines the second host is a failed host if the memory page table associated with the second host is unlocked such that the master agent is able to obtain write access to the memory page table during polling of the set of memory page tables; and
creating a new backup host within the plurality of hosts, the new backup is in the maintenance mode.

17. The non-transitory computer readable storage medium of claim 15, wherein the program code embodying the method further comprises:

deploying a crash agent on each host in the plurality of hosts, by a crash manager associated with a virtual controller, wherein the crash agent for a given host updates the memory page table associated with the given host to maintain a write access lock on the memory page table, wherein a failure of the crash agent to update the memory page table within an update time interval permits the first host to obtain the write access to the memory page table.

18. The non-transitory computer readable storage medium of claim 15, wherein the program code embodying the method further comprises:

on identifying a change in a configuration of a given host in the plurality of hosts, updating a host profile for the given host on pooled memory, the host profile is maintained in at least one shared partition in the pooled memory.

19. The non-transitory computer readable storage medium of claim 15, wherein the program code embodying the method further comprises:

applying a host profile associated with the second host to the first host, wherein the host profile of the second host comprises configuration data for the second host; and on determining the set of virtual machines are successfully resumed on the first host, updating at least one host profile in a set of host profile.

20. The non-transitory computer readable storage medium of claim 15, wherein the program code embodying the method further comprises:

terminating the set of virtual machine on the second host;

releasing locks on virtual machine memory pages associated with the set of virtual machines, the virtual machine memory pages located on at least one shared partition in pooled memory;

assigning the virtual machine memory pages to the first host; and respawning the set of virtual machines on the first host using the virtual machine memory pages and the memory page table to maintain a memory state of the virtual machines from the second host to the first host.

* * * * *